US00RE48843E

(19) United States
(12) Reissued Patent
Matsuyama et al.

(10) Patent Number: US RE48,843 E
(45) Date of Reissued Patent: Dec. 7, 2021

(54) ROLLING BEARING AND SPINDLE APPARATUS FOR MACHINE TOOL

(71) Applicant: NSK LTD., Tokyo (JP)

(72) Inventors: Naoki Matsuyama, Kanagawa (JP); Sumio Sugita, Kanagawa (JP); Yu Koiwa, Kanagawa (JP); Takaaki Anzai, Kanagawa (JP); Tamotsu Misawa, Kanagawa (JP); Masaru Terasaki, Kanagawa (JP)

(73) Assignee: NSK LTD., Tokyo (JP)

(21) Appl. No.: 16/381,315

(22) Filed: Apr. 11, 2019

Related U.S. Patent Documents

Reissue of:
(64) Patent No.: 6,742,934
Issued: Jun. 1, 2004
Appl. No.: 09/983,915
Filed: Oct. 26, 2001

(30) Foreign Application Priority Data

Oct. 27, 2000 (JP) ..... 2000-328678
Nov. 9, 2000 (JP) ..... 2000-341980
(Continued)

(51) Int. Cl.
*F16C 33/66* (2006.01)
*F16C 33/46* (2006.01)
(Continued)

(52) U.S. Cl.
CPC ..... *F16C 33/6662* (2013.01); *F16C 19/163* (2013.01); *F16C 19/26* (2013.01);
(Continued)

(58) Field of Classification Search
None
See application file for complete search history.

(56) References Cited

U.S. PATENT DOCUMENTS 3,179,478 A 4/1965 Readdy
3,832,023 A * 8/1974 Fairbank ..... 384/527
(Continued)

FOREIGN PATENT DOCUMENTS

DE 1842145 11/1961
DE 1842145 U 11/1961
(Continued)

OTHER PUBLICATIONS

English language Abstract JP11336767, Dec. 7, 1999.
(Continued)

*Primary Examiner* — Glenn K Dawson
(74) *Attorney, Agent, or Firm* — Sughrue Mion, PLLC

(57) ABSTRACT

A rolling bearing includes an inner ring having an outer surface, an outer ring having an inner surface, a plurality of rolling elements rotatably disposed between the inner ring and the outer ring, and a retainer for retaining the rolling elements. The retainer is made of a resin material and is positioned with respect to the inner surface of the outer ring or the outer surface of the inner ring. The retainer includes a pair of annular portions axially arranged in parallel and a columnar portion coupling the annular portions. Then, the rolling bearing satisfies the following expression: [$AI=LH^3/dm \geq 0.025$] $LH^3/dm^2 \geq 0.025\ mm^2$ in which H is a radial length of a section of the annular portion, L is an axial length of the same, and dm is PCD of the rolling element.

8 Claims, 25 Drawing Sheets

(30) Foreign Application Priority Data

May 28, 2001 (JP) ..... 2001-158980
Jul. 31, 2001 (JP) ..... 2001-231698

(51) Int. Cl.
*F16C 33/38* (2006.01)
*F16C 19/16* (2006.01)
*F16C 19/26* (2006.01)
*F16C 33/56* (2006.01)

(52) U.S. Cl.
CPC ..... *F16C 33/3806* (2013.01); *F16C 33/3887* (2013.01); *F16C 33/4605* (2013.01); *F16C 33/467* (2013.01); *F16C 33/4635* (2013.01); *F16C 33/6603* (2013.01); *F16C 2220/04* (2013.01); *F16C 2322/39* (2013.01)

(56) References Cited

U.S. PATENT DOCUMENTS 3,881,790 A * 5/1975 Ryanen ..... F16C 33/4635 384/576
4,841,759 A * 6/1989 Balasingam ..... E05B 37/08 70/302
5,137,376 A * 8/1992 Gutsche ..... F16C 33/416 384/470
5,192,139 A * 3/1993 Hiramoto ..... F16C 33/6677 384/476
5,226,739 A * 7/1993 Estkowski ..... B60B 33/0028 384/448
5,716,146 A * 2/1998 Murai et al. ..... 384/450
6,132,102 A 10/2000 Bessone et al.
6,315,456 B1 * 11/2001 Tanimoto et al. .. F16C 33/3856 384/527
6,565,947 B2 * 5/2003 Kasuga ..... F16C 33/3706 428/172
6,709,158 B2 * 3/2004 Ishihara ..... F16C 29/065 384/44
6,742,934 B2 * 6/2004 Matsuyama ..... F16C 33/3856 384/572
7,416,345 B2 * 8/2008 Yamamoto ..... F16C 33/416 384/470
8,523,451 B2 * 9/2013 Ozu ..... F16C 33/3706 384/551
10,422,381 B2 * 9/2019 Sugita ..... F16C 19/16
10,520,029 B2 * 12/2019 Iino ..... F16C 33/586
10,550,893 B2 * 2/2020 Iino ..... F16C 19/527
10,648,508 B2 * 5/2020 Sugita ..... F16C 33/66

FOREIGN PATENT DOCUMENTS

DE 6812425 1/1974
DE 6812425 U 1/1974
DE 9306319 U1 7/1993
DE 4223709 A1 1/1994
DE 68922373 T2 8/1995
DE 4041068 C2 10/1995
DE 19601044 A1 7/1997
EP 1006288 A2 11/1999
EP 1006288 A2 6/2000
GB 2269863 A 2/1994
JP 59-70928 U 5/1984
JP 7-40730 Y2 9/1995
JP 7-317773 A 12/1995
JP 8-93771 A 4/1996
JP 8-219148 A 8/1996
JP 9-170625 A 6/1997
JP 9-177793 A 7/1997
JP 10-26141 A 1/1998
JP 10-267037 A 10/1998
JP 11-101239 A 4/1999
JP 11-336767 A 12/1999
JP 11-347863 A 12/1999
JP 2000-320558 A 11/2000
JP 2000-346079 A 12/2000

OTHER PUBLICATIONS

English language AbstractJP10026141, Jan. 27, 1998.
English language Abstract JP2000320558, Nov. 24, 2000.
English language Abstract JP2000346079, Dec. 12, 2000.
English language Abstract JP9177793, Jul. 11, 1997.
English language Abstract JP10267037, Oct. 6, 1998.
English language Abstract JP11347863, Dec. 21, 1999.
English language Abstract JP8093771, Apr. 9, 1996.
DE-ZAntriebstechnik No. 2, 1996 Information Page INA-Scheibenkafig, pp. 4.
DE Catalogue "Kugelhatler und Kafige" Der Deutsche Star Kugelhalter GmbH, Edition Mar. 1981.

* cited by examiner

COMPARATIVE TEST RESULTS

ROLLING BEARING AND SPINDLE APPARATUS FOR MACHINE TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This is a reissue application of U.S. Pat. No. 6,742,934, which was filed as U.S. application Ser. No. 09/983,915 on Oct. 26, 2001, issued on Jun. 1, 2004, and which claims priority to JP 2000-328678, filed Oct. 27, 2000, JP 2000-341980, filed Nov. 9, 2000, JP 2001-158980, filed May 28, 2001, and JP 2001-231698, filed Jul. 31, 2001.*

BACKGROUND OF THE INVENTION

1. Field of the Invention

The present invention relates to a rolling bearing for supporting a spindle shaft of a machine tool that rotates at a high speed, and a spindle apparatus for machine tool using the rolling bearing.

2. Description of the Related Art

The conventional art will be described with a cylindrical roller bearing as an example. A bearing for supporting a spindle shaft of a machine tool requires high rotational accuracy and rigidity in order to keep the machining accuracy high. The cylindrical roller bearing used for this purpose is usually used with an inner clearance of the bearing adjusted to a small clearance of about 5 μm after the roller bearing was incorporated into the spindle shaft and a housing.

On the other hand, there is a recent tendency to use the spindle apparatus at a high speed in order to improve the machining efficiency, and it is necessary for the bearing to correspond to the speed-up. As a bearing capable of corresponding to this request, a cylindrical roller bearing having an inner ring with ribs and an outer ring without ribs (N type) is used more widely, which can more readily exhaust the supplied lubricating oil to the outside of the bearing than a cylindrical roller bearing having an outer ring with ribs and an inner ring without ribs (NU type). Further, as a retainer guide type (retainer positioning type) that is widely used at the present time, there are an inner ring guide type in which the retainer is made of a copper alloy and guided by the outer surface of the ribs of the inner ring, and a roller guide type in which the retainer is made of synthetic resin and guided by the rollers.

Further, in the conventional rolling bearing, rolling elements such as balls, rollers, or the like are interposed between raceway surfaces formed on the outer surface of the inner ring and the inner surface of the outer ring. In this rolling bearing, in order to retain the rolling elements on the raceway surface at equal intervals in the bearing circumferential direction, an annular retainer is interposed between the outer ring the inner ring.

A bearing for spindle apparatus of the machine tool that is an example of the rolling bearing requires low vibration and low noise in order to improve machining accuracy. Further, the bearing recently requires high-speed rotary performance (that it can be stably used at a high rotational speed for a long time) with grease lubrication that is effective from viewpoints of easiness of handling, environment and cost. In order to satisfy this characteristic, conventionally, there has been used a retainer which is light, superior in softness, and made of synthetic resin to which reinforced fibers are added for improvement of the strength.

FIGS. 34 and 35 shows a conventional roller bearing using a retainer of an outer ring guide type and both-side guide. FIG. 35 is a sectional view taken along a line of XXXIV-XXXIV in FIG. 34. A roller bearing 200 is schematically composed of an outer ring 201, an inner ring 202, rolling elements 203, and a retainer 204.

As shown in FIG. 35, the axial both ends of the inner ring 202 has ribs 202a that protrude toward the outer ring side in the radial direction.

The retainer 204 is made of synthetic resin, and has pocket portions 205 for retaining the rolling elements 203 in its circumferential direction at intervals. Further, the retainer 204 has sidewalls 204b, 204b that are erectly provided on the axial both sides toward the outer ring side in the radial direction. The leading end surface of the sidewall 204b, which is opposed to the outer ring 201, i.e. a guided surface 204a in this example, comes into sliding contact with the outer ring 201 or comes into close contact with it. Since the retainer 204 is guided (slide-guided) by the slide-contact of the guided surface 204a with the inner surface (guide surface) of the outer ring 201, the retainer 204 rotates relatively with respect to the outer ring 201.

Further, the retainer made of synthetic resin described the above is formed by injection-molding, and has been applied to a bearing for machine tool that frequently runs with the very small amount of grease or lubricant oil to be used in order to minimize heat-generation at the operating time. Hereby, in the bearing for machine tool, the essentially minimum amount of lubricant is used, to thereby suppress agitation resistance of softener such as the grease or the lubricant oil, and heat generation due to the agitation resistance. As a method for manufacturing such the synthetic resin-made retainer, there is a radial draw type of an injection-molding method.

FIG. 36 shows a partially sectional view of a forming mold 210 used in the radial draw type of injection molding method. A part of the forming mold 210 is schematically composed of a movable mold 211, a first slide core 212, and a second slide core 213.

The movable mold 211 has an outer surface with a cylindrical shape that forms an inner surface of the retainer. At the outer periphery of the movable mold 211, plural slide cores (not shown) are arranged, which form an outer surface of the retainer and pocket portions for retaining rolling elements at the mold tightening time. The first slide core 212 and the second slide core 213 of the plural slide cores are formed in a convex shape in section, and they are composed of circular-arc shaped base portions 212a, 213a located along with the outer surface of the movable mold 211 and columnar protrusions 212b, 213b that are erectly provided substantially perpendicularly toward the surfaces on the movable mold 211 side of the base portions and form the pocket portions of the retainer.

When the forming mold 210 is tightened, the protrusions 212b, 213b of the slide cores 212, 213 come into contact with the predetermined positions on the outer surface of the movable mold 211, and the adjacent side surfaces 212c, 213c of the base portions 212a, 213a of the slide cores comes into contact with each other, whereby a cavity space of the retainer is formed. Then, by injecting the synthetic resin in the cavity space, an annular retainer 220 made of the synthetic resin is formed, which has the pocket portions arranged in the circumferential direction at intervals.

FIG. 37 shows a side view of the retainer 220 formed by the forming mold 210. A parting line PL, which has been formed by bringing the side surfaces 212c, 213c of the slide cores 212, 213 into contact with each other at the injection-molding time, is formed between the adjacent pocket portions of the plural pocket portions 221 to each other on the outer surface of the retainer 220. FIG. 38 is a plan view of the retainer 220 viewed from a direction XXXVII in FIG. 37.

Moreover, in the rolling bearing in which the guide type of the retainer is an inner ring guide type or an outer ring guide type, a appropriate clearance (guide clearance) is provided between the inner diameter surface of the retainer (or outer diameter surface) that comes into contact with a raceway ring (the inner ring and outer ring) and a contact surface of the raceway ring. The guide clearance is set to be a difference between a diameter of a retainer guide surface of the raceway ring and a diameter of the guided surface of the retainer. Further, in order to guide and retain the rolling element, a clearance (pocket clearance) is provided between the rolling element in the pocket of the retainer and the pocket.

Conventionally, in this type of rolling bearing used for high-speed rotation, a guide clearance 5 of the retainer 4 is 0.4 to 1.0% of a guide diameter d1 (a retainer inner diameter 4a), and a pocket clearance 6 is 2 to 4% of the ball diameter, which is 0.5 to 2 times the above guide clearance 5 (FIG. 39).

In case that the bearing rotates at a high speed at the operating time of the machine tool, grease filled inside the bearing or lubricating oil supplied by oil-air lubrication is scattered to the outer ring side by centrifugal force, so that in case of the inner ring guide retainer, there is a possibility that lubricant defect of the guided surface causes seizure. Further, at the time of the high-speed rotation, due to expansion of the inner ring groove and outer cylinder cooling by the centrifugal force, and the increase of the inner/outer ring temperature difference by the influence of a motor built in a machine, the inner clearance of the bearing becomes negative during running, so that there is also a problem that roller load increases. Further, the retainer is whirled by the centrifugal force at the time of the high-speed rotation, and the retainer made of the synthetic resin has also a problem that the amount of deformation is large in case that the strength of the retainer is low. Particularly, in case of the roller guide retainer, since the retainer holds the rollers therein and is guided by the rollers, when whirling of the retainer is produced by the influence of the centrifugal force or when the amount of deformation is large, the roller is restrained in the pocket portion, and its operation is obstructed. Further, the excessive load is applied onto the retainer by the rollers, so that there is fear that the retainer is broken.

In case that the bearing 30 having the above outer ring guide retainer is used as the bearing for spindle apparatus of the machine tool, when the spindle shaft is run at a high speed, grease filled in the bearing is scattered to the outer ring side of the bearing by centrifugal force, so that the scattered grease is raked out to the side of the retainer by the retainer and comes to form a bank. By leakage of a very small amount of base oil from this state, the rolling surface and the guided surface of the retainer are lubricated. However, since the guided surface 34a of the retainer 34 is slide-guided by the inner surface of the outer ring 31 (or the outer surface of the inner ring 32), when an oil film runs short, the bearing causes wear of the guided surface 34a of the retainer 34, and wear of the outer ring 31 or the inner ring 32 by the reinforced fiber added in order to improve the strength of the retainer 34. At this time, there was a possibility that wear powders produced in the raceway surface and the guided surface 34a deteriorate the grease.

Further, recently, with speed-up of the spindle rotation of the machine tool, it is not rare that the spindle shaft is rotated at a region in which, for example, a Dmn value (bearing pitch circle diameter (mm)×rotation speed (rpm)) is over $1\times10^6$. In case of such the high-speed rotation, since the grease is raked out to the outside of the guided surface by the centrifugal force, the grease cannot be held on the guided surface 34a of the retainer 34. Therefore, it is difficult to form the oil film on the guided surface 34a of the retainer 34. And, not only the guided surface 34a is worn but also the inner surface of the outer ring 31 opposed to the retainer 34 is worn by the reinforced fiber added to the retainer 34 for improvement of the strength, so that the grease is early deteriorated by the wear powders produced at this time.

In case of the inner ring guide type of the retainer, the surface of the sidewall of the retainer, opposed to the inner ring, becomes a guided surface, and the outer surface of the inner ring, opposed to the guided surface becomes a guide surface. In this case, when the inner ring rotates, the grease on the slide-guided surface of the retainer is scattered to the outer ring side by the centrifugal force. Therefore, lubricating property between the guided surface of the retainer and the guide surface of the inner ring remarkably lowers, which causes early breakage of the retainer and the inner ring.

Further, as shown in FIG. 38, the parting line PL formed on the outer surface of the retainer 220 by the radial draw type of the injection-molding method has a burr projecting in the radial direction of the retainer and protruded burr extending axially. This burr, while the retainer 220 is incorporated into the bearing and the bearing is operating, comes into slide-contact with the inner surface of the outer ring of the bearing and wears thereby to produce wear powders, or causes a torque variation thereby to disturb the rotation of the bearing.

Conventionally, the burr was removed by cutting or barrel machining before the injection-molded retainer was incorporated into the bearing by removing operation, whereby the rotation of the bearing was made good.

However, the burr removal working is complicated, which causes the increase of cost of the rolling bearing.

Further, regarding the clearance of the retainer, since the conventional guide clearance 5 is large so that it is 0.4 to 1.0% of the guide diameter d1, when the retainer 4 whirls at the time of the high-speed rotation, the retainer 4 causes balls 3 to be arranged unequally, which gives an influence onto run-out accuracy of a shaft.

Frequency of this run-out (hereinafter, this can be referred to as "Fc run-out") is a rotational frequency of the retainer, and different from a rotational frequency of the shaft.

In case that the bearing is used in the spindle apparatus for machine tool, if this FC run-out is produced, there is a possibility that an influence may be given on a problem of worsening the external appearance of the machine surface (problem of generating a sink mark).

Specifically, FIG. 39 shows a schematic diagram of a general rolling bearing of the inner ring guide type. The retainer 4 is rotationally moved while being guided by the retainer guide surface 2a (outer diameter d2) of the inner ring 2. Particularly in case of high-speed rotation, with unbalance of the retainer 4 as a start, the retainer 4 starts this rotational movement.

By this rotational movement, since a center of the pocket 4b is out of the equal layout position of the ball 3, the unequal layout of the ball 3 is produced. In the figure, reference numeral 1 represents the outer ring, reference character P represents an equal layout position of the ball, and reference character R represents an unequal layout angle of the ball.

Further, as shown in FIG. 39, in case that the pocket clearance 6 is smaller than the guide clearance 5, even if the ball 3 intends to return to the equal layout position, it cannot return there, so that the unequal layout becomes large.

By this unequal layout of the ball 3, the radial rigidity of the bearing changes in the circumferential direction, and the displacement is produced in the center of the shaft. This displacement is produced with the same frequency as the rotational frequency of the retainer, and causes the Fc run-out.

SUMMARY OF THE INVENTION

The invention has been made in view of these problems, and an object of the invention is to provide a rolling bearing in which the lubrication property is improved, and deformation and breakage of the retainer can be suppressed, and to a spindle apparatus for machine tool using it.

Further, the object of the invention is to provide a rolling bearing in which the lubrication property can be improved and high-speed stability can be secured.

In addition, the object of the invention is to provide a rolling bearing in which working steps can be reduced and operation defect is not produced.

Moreover, the object of the invention is to reduce generation of the Fc run-out of the shaft produced by whirling of the retainer at the time of the high-speed rotation.

In order to achieve such the object, there is provided a rolling bearing, comprising:

an inner ring having an outer surface;

an outer ring having an inner surface;

a plurality of rolling elements rotatably disposed between the inner ring and the outer ring; and, a retainer for retaining the rolling elements, the retainer being made of a resin material, the retainer being positioned with respect to the inner surface of the outer ring or the outer surface of the inner ring, the retainer including a pair of annular portions axially arranged in parallel and a columnar portion coupling the annular portions, wherein the following expression is obtained:

$$[AI=LH^3/dm^2 \geq 0.025]\ LH^3/dm^2 \geq 0.025\ mm^2 \quad (1)$$

in which H is a radial length of a section of the annular portion, L is an axial length of the same, and dm is PCD of the rolling element.

According to this invention, the retainer is positioned with respect to the inner surface of the outer ring, that is, the guided surface of the retainer is provided in the retainer outer surface opposed to a raceway surface of the outer ring. Therefore, a clearance between the outer surface of the inner ring and the inner surface of the retainer, or a clearance between the inner surface of the outer ring and the outer surface of the retainer can be designed to be comparatively large. As a result, lubricating oil ejected from a nozzle for oil-air or oil-mist lubrication can be surely introduced into the bearing from the comparatively large clearance, and the lubricating oil is scattered to the outer ring side by centrifugal force, so that the guided surface of the retainer is lubricated smoothly.

The retainer is guided thus by the outer ring or the inner ring, whereby the whirling amount of the retainer at the time of the high-speed rotation can be controlled by the guide clearance. Further, as a material of the retainer, there is used a resin material in which the seizure is hardly caused even with a slight amount of lubrication, and the above expression (1) is satisfied, in which H is the radial length of the section of the annular portion, L is the axial length of the same, and dm is PCD of the rolling element, whereby higher rigidification becomes possible than in the conventional retainer, and the amount of deformation at the high-speed rotating time can be suppressed.

As the resin material of the retainer, phenol resin, polyamide 46, polyamide 66, polyphenylene sulfaid, thermoplastic polyimide, polyether etherketone, and the like can be used as base material. Further, it is preferable to add glass fiber by 10-40 wt %, carbon fiber by 10-30 wt %, or aramid fiber by 10-30 wt % in order to improve strength of the retainer. Further, in order to satisfy use in high-speed rotation, the carbon fiber or the aramid fiber is more preferable. However, according to the use, the glass fiber can be also selected. In case that the addition amount of the carbon fiber or the aramid fiber is 10 wt % or less, the strength cannot be sufficiently maintained. In case that it is 30 wt % or more, the molding property is deteriorated and the external appearance is also bad. Further, more preferably, the addition amount of the carbon fiber or the aramid fiber is 20-30 wt %, whereby both the strength and the molding property become improved. The addition amount of the glass fiber is preferably 10-40 wt %, and this reason is the same as the above reason.

However, in case of the cylindrical roller bearing, if the axial width of the retainer of the outer ring guide type is set so as to satisfy the above expression (1), there is a fear that a lead-in portion of the outer ring raceway surface, which is provided in order to smoothly perform the incorporation of the cylindrical rollers, interferes with the guided surface of the retainer by the axial movement of the inner ring due to an incorporation error and shaft expansion during running. Hereby, such a disadvantage is caused that the brake is applied on running of the retainer and the guided surface of the retainer wears. Against this, chamfering and tapering are applied to the peripheral portion of the guided surface of the retainer, and a clearance of 0.5 mm or more is provided axially up to an intersecting point of the raceway surface of the outer ring and the lead-in portion, whereby this disadvantage can be avoided.

Further, a notch is provided for at least one of four corners in each pocket of the retainer for retaining the rolling elements, whereby it is possible to speedily move the lubricating oil supplied to the raceway surface of the inner ring and the ribs, according to the rotational speed of the bearing, through the notch to the raceway surface of the outer ring.

Further, a roller or ball guide portion in circumferential direction of the pocket has a flat surface, which is parallel to the shaft which the bearing supports. Thus, a snap portion for retaining the roller or the ball, in view of the moving amount of the retainer and dimensional tolerance, can be formed so that it does not interfere with the roller or the ball at worst during running, and the high-speed rotation can be realized without obstructing the movement of the roller or the ball. In addition, in order to obtain high-speed stabilization of the retainer, the both-side guide effective for inclination of the retainer is preferable.

Further, in order to attain the above object, there is provided a rolling bearing comprising:

an inner ring having an outer surface;

an outer ring having an inner surface;

a plurality of rolling elements rotatably disposed between the inner ring and the outer ring; and, a retainer for retaining the rolling elements, the retainer being made of a resin material, the retainer including a guided surface that is guided by the inner surface of the outer ring or the outer surface of the inner ring, wherein the guided surface has two or more recesses.

The guided surface of the retainer is opposed to either the inner surface of the outer ring or the outer surface of the inner ring, and located on circumference of the retainer that comes into slide-contact with the outer ring or the inner ring.

According to this rolling bearing, even when it is used in such a high-speed rotation region that a Dmn value is over $1\times10^6$, not only the grease can be held on the guided surface of the retainer made of synthetic resin but also an oil film by the grease is appropriately formed since a wedge effect is produced in the recess portion. Namely, the clearance between the guided surface of the retainer and the guide surface of the raceway ring is large in the point where the recess is provided and small in other points than it, and the grease held in the recess is pulled into the points where the clearance is small. As a result, it is prevented that the guided surface of the retainer is worn by the slide with the raceway surfaces of the outer ring and inner ring, and the rolling bearing that is superior in high-speed stability (low-torque, low-noise, low-vibration, seizure-resistance) can be provided. Further, since the rolling bearing of the invention can suppress the occurrence of the iron powder due to wear, the deterioration of the grease is prevented, so that a long use becomes possible.

In the above constitution, a depth of the recess portion in the radial direction of the retainer is preferably 0.3 mm or more. Hereby, on the guided surface of the retainer made of synthetic resin, the enough grease can be held.

Moreover, to attain the above object, there is provided a rolling bearing, comprising:

an inner ring;

an outer ring;

a plurality of rolling elements rotatably disposed between the inner ring and the outer ring; and a retainer for retaining the rolling elements, the retainer being made of a resin material and formed by an injection-molding, the retainer having a recess axially extending on an outer periphery (an outermost surface) thereof, wherein the recess has a parting line formed at the time of injection-molding.

Here, "outermost surface of the retainer" means an outer surface located outermost in the radial direction of the annular retainer, that is, an outer surface located outside in the radial direction of the retainer from a parting line formed on the outer surface except for at least the outermost surface.

Further, it is preferable that the recess formed on the outermost surface has such a depth that the parting line formed in the recess portion does not protrude outward of the retainer from the outermost surface.

According to the rolling bearing of the invention, since the parting line formed on the outer surface of the retainer does not protrude from the outermost surface of the retainer, the retainer can be incorporated into the bearing without having necessity to perform after-treatment after injection-molding of the retainer. Accordingly, the assembly process of the rolling bearing can be simplified, and yield of parts of the retainer can be also improved. Further, when the retainer is incorporated into the bearing, the parting line formed on the outer surface of the retainer does not come into slide-contact with the inner surface of the outer ring of the bearing. Namely, during running of the rolling bearing, the bad operation due to wear of the parting line and the torque change is not caused.

Further, in this case, a forming mold comprises a fixed mold for forming one end of the retainer, a columnar movable mold for forming the inner surface of the retainer and the other end, and a plurality of slide-cores that are arranged outside of the movable mold, formed convexly in a section, and form the outer surface of the retainer and the pocket portions. The slide cores have a circular-arc shaped base portion put side by side with the outer surface of the movable mold and a protrusion erectly provided on the surface on the movable mold side of the base portion nearly perpendicularly.

When a forming mold is tightened, the leading end surface of the protrusion of the slide core comes into contact with the outer surface of the movable mold, and side surfaces of the base portions of the slide cores adjacent to each other comes contact with each other, whereby a cavity space is formed at the periphery of the movable mold, and synthetic resin material is injected in the cavity space, so as to form a retainer. In a apparatus of manufacturing a rolling bearing retainer that forms thus the retainer, it is preferable that a projection member that protrudes to the movable mold side is provided on the inner surface of the contact portion of the base portion that becomes an outermost surface of the retainer when the side surfaces of the base portions adjacent to each other come into contact with each other, and that the parting line formed on the outermost surface of the retainer when the synthetic resin is injected is formed in the recess portion formed by the projection member.

According to this apparatus of manufacturing the rolling bearing retainer, since the parting line formed on the outer surface of the retainer does not protrude from the outermost surface of the retainer, it is necessary to perform after-treatment after injection-molding of the retainer. Accordingly, the assembly process of the rolling bearing can be simplified, and yield of parts of the retainer can be also improved.

In addition, there is provided a rolling bearing, including:

an inner ring having an outer surface;

an outer ring having an inner surface;

a plurality of rolling elements rotatably disposed between the inner ring and the outer ring; and a retainer for retaining the rolling elements, the retainer being made of a resin material, the retainer including a guided surface that is guided by the inner surface of the outer ring or the outer surface of the inner ring and a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer-and the rolling element is set to 0.8-1.8% of the guide clearance.

DETAILED DESCRIPTION OF THE PREFREED EMBODIMENTS

Description will be given of embodiments of the invention with reference to drawings.

Figure 1:
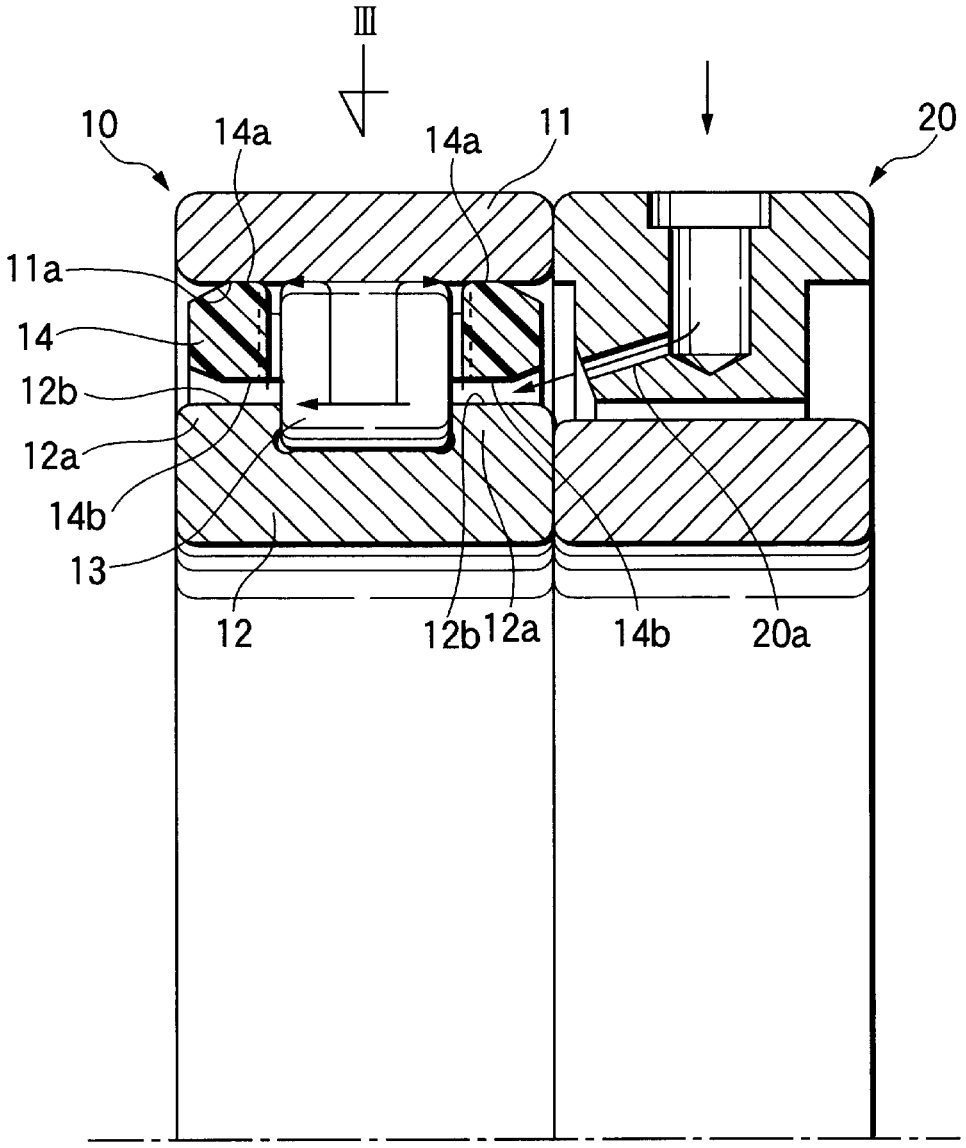
FIG. 1 is an axially sectional view showing a bearing apparatus according to a first embodiment of the invention.
Figure 2:
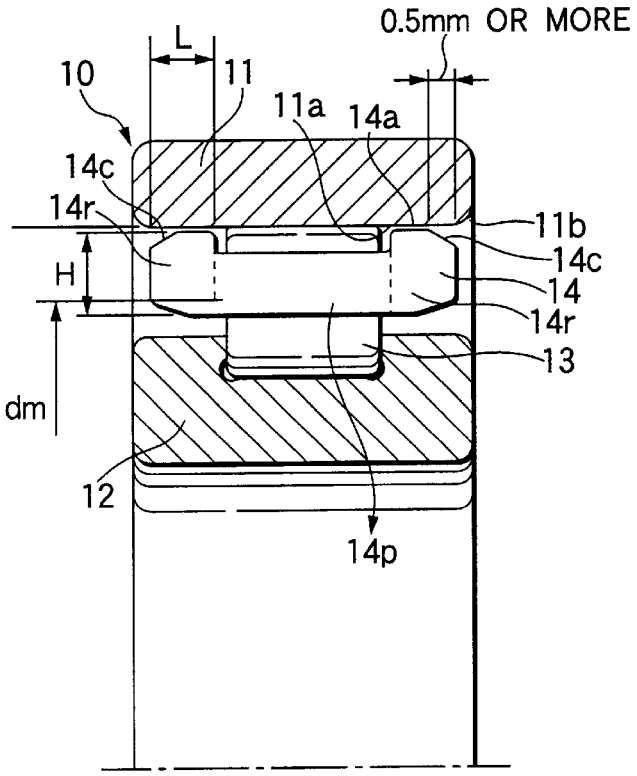
FIG. 2 is an enlarged view showing only the bearing in this embodiment.

FIG. 1 is an axially sectional view, showing a rolling bearing according to a first embodiment of the invention. FIG. 2 is an enlarged view showing only the rolling bearing in this embodiment. A rolling bearing 10 includes an outer ring 11 without rib, an inner ring 12 with ribs 12a at both ends, plural rollers (rolling elements) 13 rotatably provided between the both rings 11 and 12, and a retainer 14 for retaining the rollers 13. In FIG. 1, a lubricating oil supplying apparatus 20 for oil-air or oil-mist lubrication is provided adjacent to the rolling bearing 10. A supply passage 20a of the lubricating oil supplying apparatus 20 is directed to the inside of the rolling bearing 10 so as to eject the lubricating oil sent from the external with pressure, into the inside of the bearing 10.

The retainer 14 is positioned with respect to the inner periphery of the outer ring 11, and an outer surface 14a of the retainer 14 opposed to a raceway surface 11a of the outer ring 11 serves as a guided surface of the retainer 14. Therefore, it is possible to design a clearance between an outer surface 12b of the rib 12a of the inner ring 12 and an inner surface 14b of the retainer 14 relatively large. As a result, the lubricating oil ejected from the supply passage 20a of the lubricating oil supplying apparatus 20, as shown by an arrow in FIG. 1, is surely introduced from this relatively wide clearance into the inside of the rolling bearing 10, and the lubricating oil is scattered to the outer ring side by centrifugal force, so that the guided surface of the retainer 14 can be lubricated smoothly.

Further, the retainer 14 of the outer ring guide type can control the whirling amount of the retainer 14 at the time of high-speed rotation by the guide clearance. As a material of the retainer 14, phenol resin, polyamide 46, polyamide 66, polyphenylene sulfaid, thermoplastic polyimide, polyether etherketone, and the like can be used as base material. Further, in order to improve the strength of the retainer, it is preferable to add glass fiber by 10-40 wt %, carbon fiber by 10-30 wt % or aramid fiber by 10-30 wt %. Further, in order to satisfy use in the high-speed rotation, the carbon fiber or the aramid fiber is more preferable. However, according to the use, the glass fiber can be also selected. In case that the addition amount of the carbon fiber or the aramid fiber is 10 wt % or less, it is insufficient to keep the strength, and in case that it is 30 wt % or more, the molding property is deteriorated and the external appearance is also bad. Further, it is more preferable that the addition amount of the carbon fiber or the aramid fiber is 20-30 wt %, whereby both strength and the molding property are improved. The addition amount of the glass fiber is preferably 10-40 wt %, and this reason is the same as the above reason.

Further, as shown in FIG. 2, the retainer 14 has a pair of annular portions 14r juxtaposed axially and a columnar portion 14p coupling the annular portions 14r. And, the retainer 14 satisfies the following expression:

$$[AI=LH^3/dm^2 \quad (1)]$$

$$[AI\geq 0.025]\ LH^3/dm^2\geq 0.025\ mm^2, \quad [(2)]\ (1),$$

in which H is a radial length of a section of the annular portion 14r, L is an axial length of the same, and dm is PCD (pitch circle diameter) of the rolling element 13. The retainer 14 thus designed can obtain high rigidity compared with the conventional retainer, and suppress the amount of deformation at the high-speed rotating time.

However, in case that the annular portion 14r (i.e., pocket shape) of the outer ring guide type of the retainer 14 is designed so that the two expressions (1), (2) are satisfied, there is a fear that a lead-in portion 11b provided in order to incorporate the cylindrical roller 13 smoothly and formed inside the end portion of the raceway surface 11a of the outer ring 11 interferes with the guided surface 14a of the retainer 14 by the axial movement of the inner ring 12 due to the incorporation error and shaft expansion during running. Hereby, such a disadvantage causes that brake is applied on running of the retainer 14 or the guided surface 14a of the retainer 14 is worn. In case of this embodiment, chamfering (or tapering) 14c is provided at the outer peripheral end of the guided surface 14a of the retainer 14, and the inward end of the chamfering 14c is axially arranged apart from an intersecting point of the raceway surface 11a and the lead-in portion lib of the outer ring 11 by 0.5 mm or more, whereby avoiding the above disadvantage.

Figure 3:
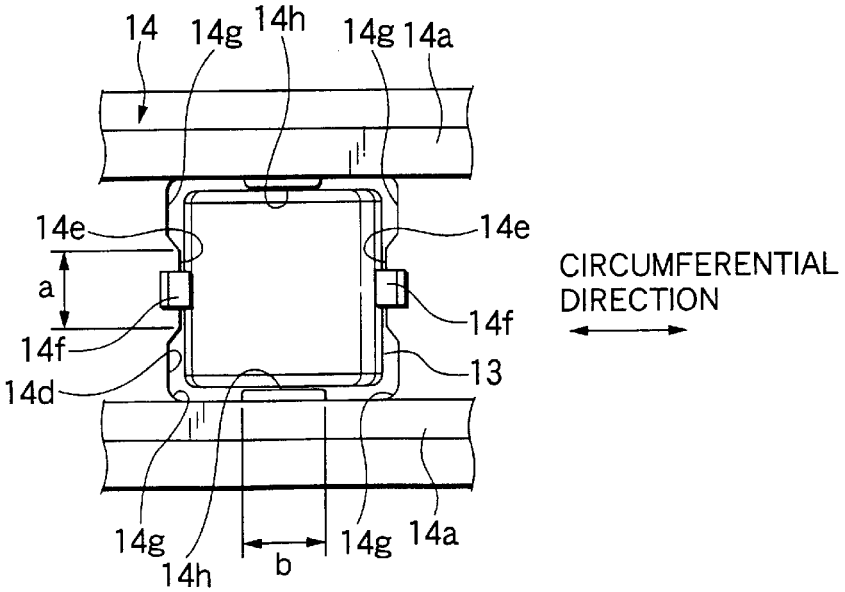
FIG. 3 is a diagram viewed from a direction of an arrow III in FIG. 1, in which an outer ring is removed from the bearing apparatus of FIG. 1.
Figure 4:
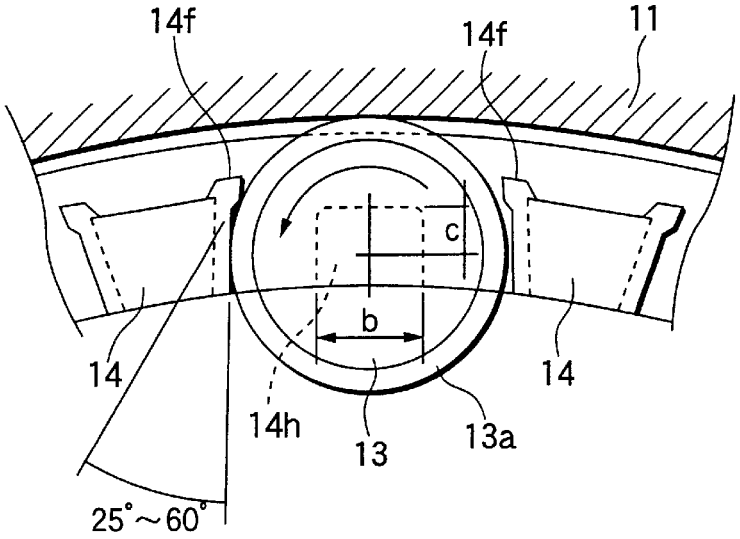
FIG. 4 is a diagram showing a state in which an inner ring is removed from the bearing apparatus shown in FIG. 1, viewed axially.

FIG. 3 is a diagram viewed from the direction of an arrow III in FIG. 1, in which the outer ring is removed from the bearing. FIG. 4 is a diagram viewed axially, in which the inner ring is removed from the bearing in FIG. 1. As shown in FIG. 3, a pocket 14d of the retainer 14 for retaining the roller 13 has notches 14g at its four-corners, whereby it is possible to speedily move the lubricating oil supplied to the raceway surface and ribs of the inner ring 12, according to the rotational speed of the bearing 10, through these notches 14g to the raceway surface 11a (FIG. 1) of the outer ring 11.

A roller guide surface 14e in circumferential direction of the pocket 14d is formed in a flat shape with an axial width a. Further, axial guide surfaces 14h of the retainer 14 come into contact with the both end surfaces of the roller 13 by a circumferential length b (refer to FIG. 4). The width a of the guide surface 14e is set to 20-80% of the roller length L2, the length b of the guide surface 14h to 40-80% of the roller diameter, and the height c (refer to FIG. 4) of the guide surface 14h from PCD of the roller 13 to 20-40% of the outer diameter D of the roller 13, so as to reduce the contact area of the roller 13 and the retainer 14, and suppress the interference between a chamfering portion 13a of the roller 13 and the guide surface 14h. A chamfering angle of a snap portion 14f is preferably is set to 25-60°. Further, the snap portion 14f is so designed that even if the retainer 14 moves radially by the guide clearance and the roller 13 moves in the circumferential direction by the pocket clearance, the snap portion does not interfere with the roller 13. In addition, this embodiment adopts the both-side guide effective for inclination of the retainer 14 in order to obtain high-speed stabilization of the retainer 14, but one-side guide may be adopted.

Figure 14:
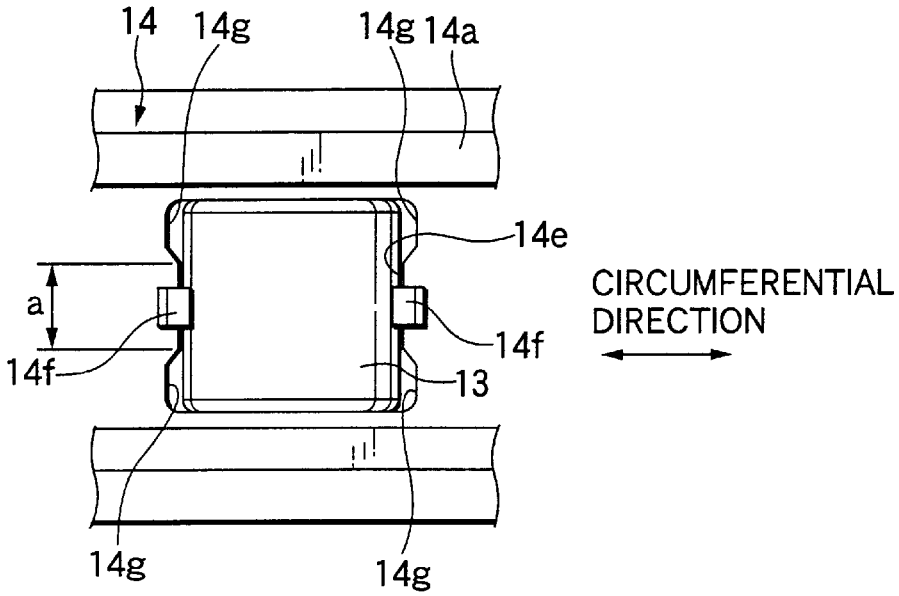
FIG. 14 is a diagram showing a modified example of the bearing apparatus in FIG. 1, which is similar to FIG. 3.
Figure 15:
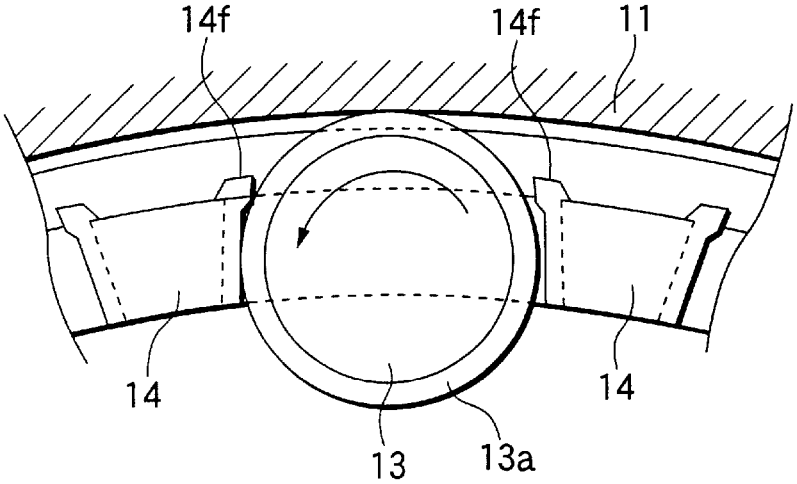
FIG. 15 is a diagram showing a modified example of the bearing apparatus in FIG. 1, which is similar to FIG. 4.

The axial guide surface 14h of the retainer 14 may be omitted like a modified example shown in FIGS. 14 and 15 as long as a space through which the lubricating oil can pass is provided. Further, the above is similar also in an inner ring guide type of the retainer serving as a retainer for under-race lubrication. Therefore, although the guide is performed by the outer ring, it may be guided by the inner ring. In the above embodiment, although the cylindrical roller bearing is described, the invention may be applied to ball bearings. Embodiments of these bearings will be described below with reference to drawings.

Figure 7:
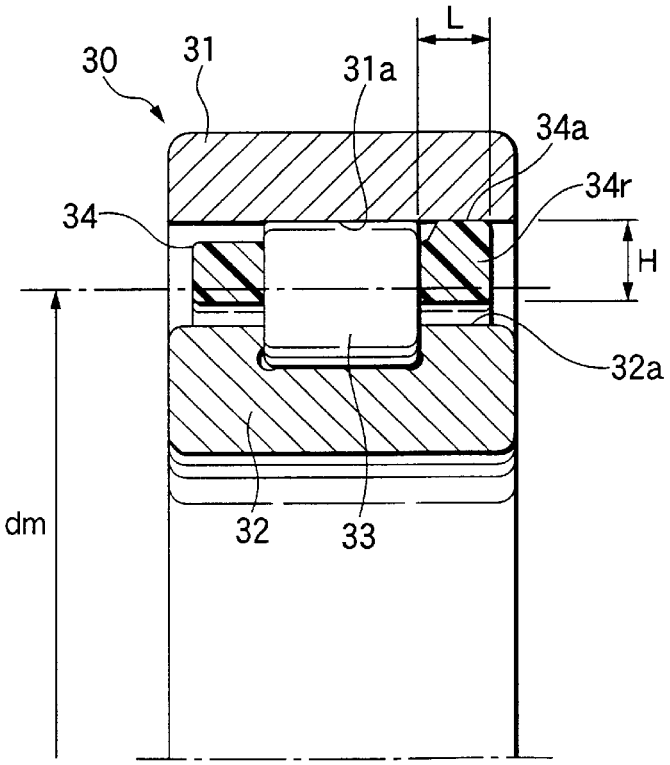
FIG. 7 is a sectional view of a cylindrical roller bearing apparatus according to a second embodiment of the invention, which is similar to the sectional view in FIG. 2.

FIG. 7 is a sectional view of a cylindrical roller bearing according to a second embodiment of the invention, which is similar to the sectional view in FIG. 2. In FIG. 7, a bearing 30 has an outer ring 31 without rib, an inner ring 32 with ribs 32a at both ends, plural rollers (rolling elements) 33 rotatably provided between the both rings 31 and 32, and a retainer 34 for retaining the rollers 33. A lubricating oil supplying apparatus for oil-air or oil-mist lubrication (not shown in FIG. 7) is provided adjacent to the roller bearing 30.

Similarly to the embodiment shown in FIG. 2, the retainer 34 is also positioned with respect to the inner periphery of the outer ring 31. However, in this embodiment, a guided surface of the retainer 34 is provided on only an outer surface 34a of an annular portion 34r on the right side in FIG. 7, opposed to a raceway surface 31a of the outer ring 31. In this embodiment, H is a radial length of a section of the right annular portion 34r of the retainer 34, and L is an axial length of the same. Other constitution is the same as that in the above-described embodiment, and the working and the effect thereof can be obtained similarly.

Figure 8:
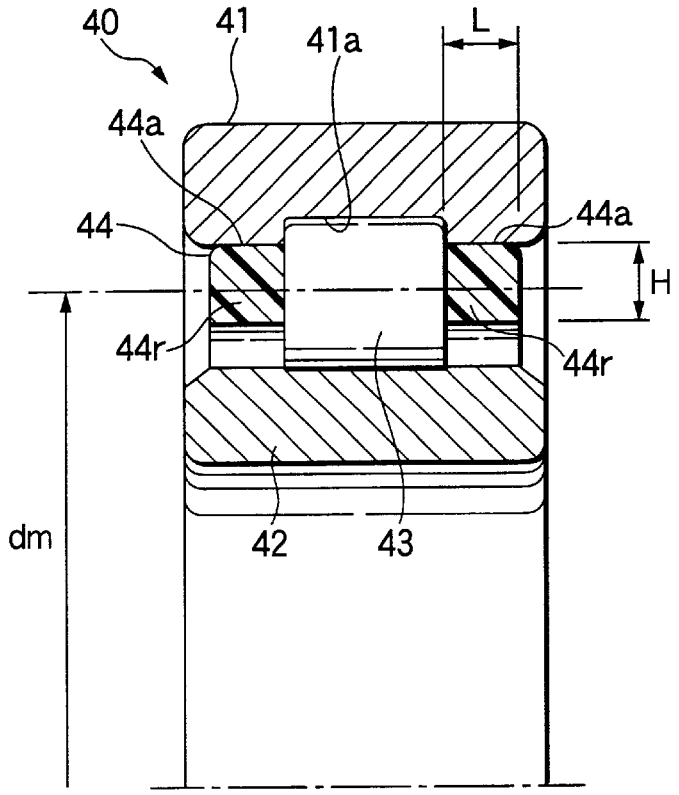
FIG. 8 is a sectional view of a cylindrical roller bearing apparatus according to a third embodiment of the invention, which is similar to the sectional view in FIG. 2.

FIG. 8 is a sectional view of a cylindrical roller bearing according to a third embodiment of the invention, which is similar to the sectional view in FIG. 2. In FIG. 8, a bearing 40 has an outer ring 41 with ribs, an inner ring 42, plural rollers (rolling elements) 43 rotatably provided between the both rings 41 and 42, and a retainer 44 for retaining the rollers 43. A lubricating oil supplying apparatus for oil-air or oil-mist lubrication (not shown in FIG. 8) is provided adjacent to the rolling bearing 40.

Similarly to the embodiment shown in FIG. 2, the retainer 44 is also positioned with respect to the inner periphery of the outer ring 41, and a guided surface of the retainer 44 is provided on a retainer outer surface 44a opposed to a raceway surface 41a of the outer ring 41. The basic constitution except that the inner ring 42 has no ribs is the same as that in the above-described embodiment, and the working and the effect can be obtained similarly.

Figure 9:
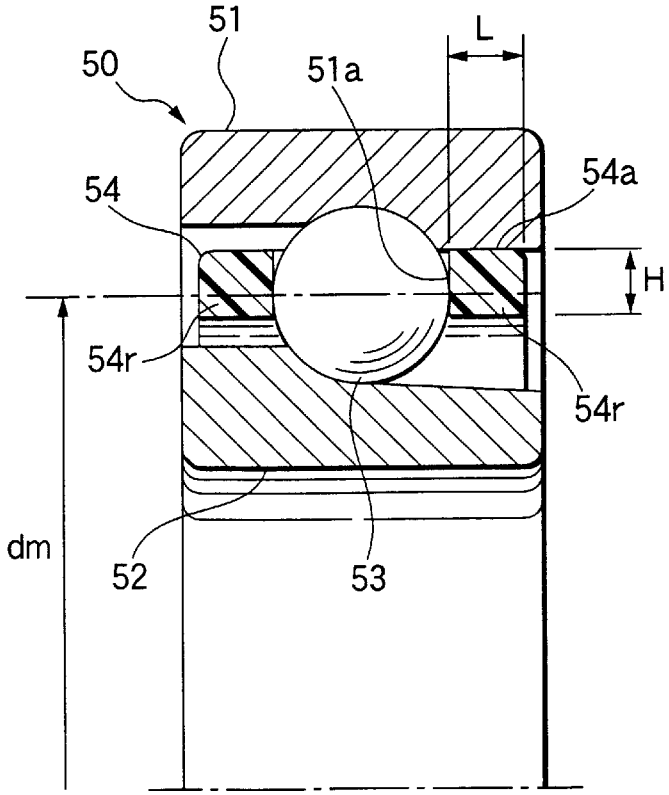
FIG. 9 is a sectional view of an angular ball bearing apparatus according to a fourth embodiment of the invention, which is similar to the sectional view in FIG. 2.

FIG. 9 is a sectional view of an angular ball bearing according to a fourth embodiment of the invention, which is similar to the sectional view in FIG. 2. In FIG. 9, a bearing 50 has an outer ring 51, an inner ring 52, plural balls (rolling elements) 53 rotatably provided between the both rings 51 and 52, and a retainer 54 for retaining the balls 53. A lubricating oil supplying apparatus for oil-air or oil-mist lubrication (not shown in FIG. 9) is provided adjacent to the bearing 50.

Similarly to the embodiment shown in FIG. 2, the retainer 54 is also positioned with respect to the inner periphery of the outer ring 51. However, in this embodiment, a guided surface of the retainer 54 is provided on only an outer surface 54a of an annular portion 54r on the right side in FIG. 9, opposed to an inner surface 51a of the outer ring 51. In this embodiment, H is a radial length of a section of the right annular portion 54r of the retainer 54, and L is an axial length of the same. Other constitution than the above main different point is the same as that in the above-described embodiment, and the working and the effect can be obtained similarly.

Figure 10:
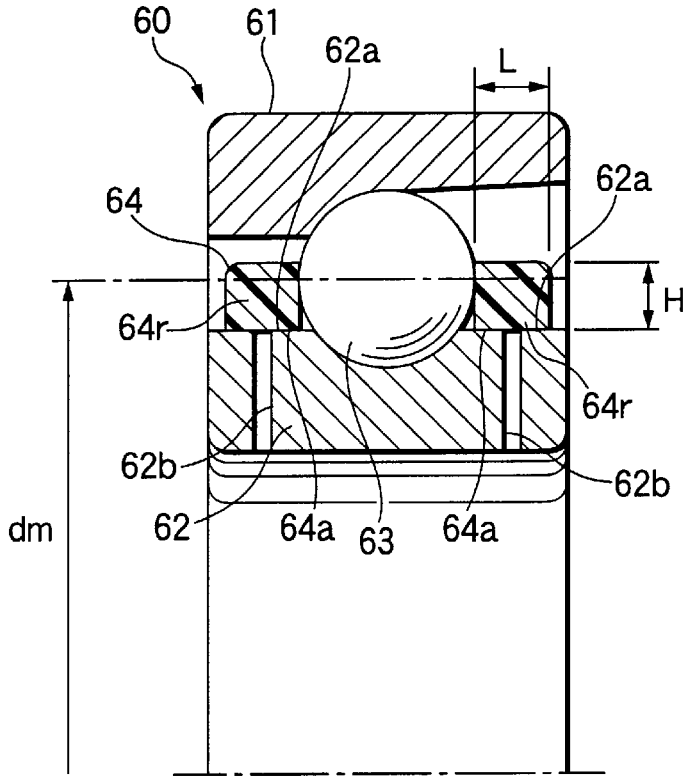
FIG. 10 is a sectional view of an angular ball bearing apparatus according to a fifth embodiment of the invention, which is similar to the sectional view in FIG. 2.

FIG. 10 is a sectional view of an angular ball bearing according to a fifth embodiment of the invention, which is similar to the sectional view in FIG. 2. In FIG. 10, a bearing 60 has an outer ring 61, an inner ring 62, plural balls (rolling elements) 63 rotatably provided between the both rings 61 and 62, and a retainer 64 for retaining the balls 63. As shown in FIG. 10, oil supply ports 62b for under-race lubrication are provided for the inner ring 62, and lubricating oil is supplied to an inner surface 64a of the retainer 64.

The retainer 64 in this embodiment is positioned with respect to the outer periphery of the inner ring 62, so that a guided surface of the retainer 64 is provided on the retainer inner surface 64a opposed to an outer surface 62a of the inner ring 62. The basic constitution except for the above-described main different point is the same as that in the above-described embodiment, and the working and the effect can be also obtained similarly.

Figure 11:
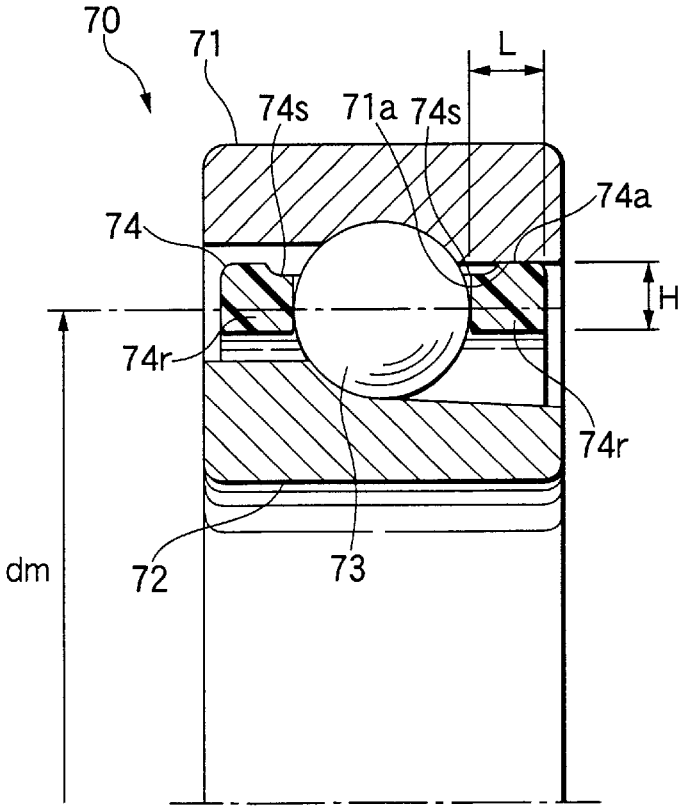
FIG. 11 is a sectional view of an angular ball bearing apparatus according to a sixth embodiment of the invention, which is similar to the sectional view in FIG. 2.

FIG. 11 is a sectional view of an angular ball bearing according to a sixth embodiment of the invention, which is similar to the sectional view in FIG. 2. In FIG. 11, a bearing 70 has an outer ring 71, an inner ring 72, plural balls (rolling elements) 73 rotatably provided between the both rings 71 and 72, and a retainer 74 for-retaining the balls 73. A lubricating oil supplying apparatus for oil-air or oil-mist lubrication (not shown in FIG. 11) is provided adjacent to the bearing 70.

Similarly to the embodiment shown in FIG. 2, the retainer 74 is also positioned with respect to the inner periphery of the outer ring 71. However, in this embodiment, a guided surface of the retainer 74 is provided on only an outer surface 74a of an annular portion 74r on the right side in FIG. 11, opposed to an inner surface 71a of the outer ring 71. And, step portions 74s faced inwardly are formed on the outer surfaces of a pair of the annular portions 74r of the retainer 74. In this embodiment, H is a radial length of a section of the right annular portion 74r of the retainer 74, and L is an axial length of the same. Other constitution than the above main different points is the same as that in the above-described embodiment, and the working and the effect can be obtained similarly.

Figure 12:
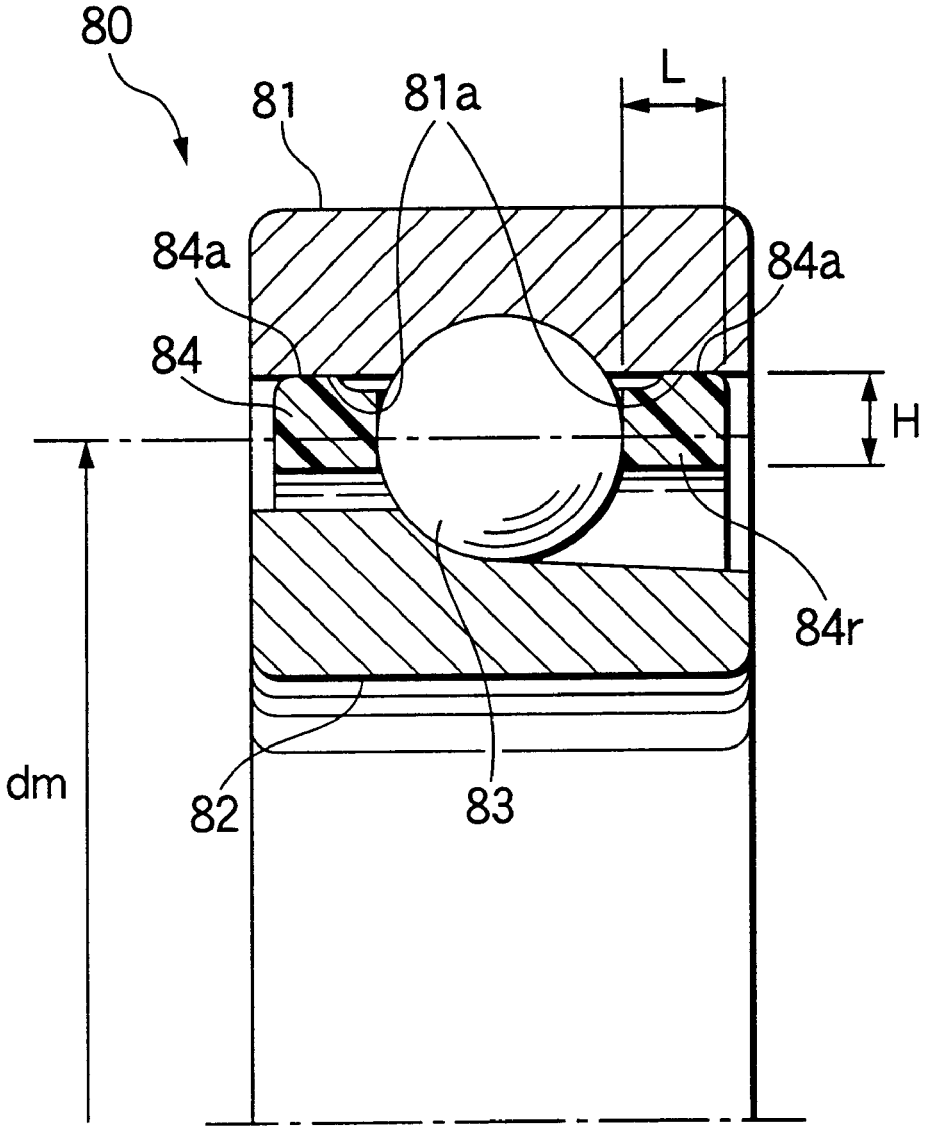
FIG. 12 is a sectional view of an angular ball bearing apparatus according to a seventh embodiment of the invention, which is similar to the sectional view in FIG. 2.

FIG. 12 is a sectional view of an angular ball bearing according to a seventh embodiment of the invention, which is similar to the sectional view in FIG. 2. In FIG. 12, a bearing 80 has an outer ring 81, an inner ring 82, plural balls (rolling elements) 83 rotatably provided between the both rings 81 and 82, and a retainer 84 for retaining the balls 83. A lubricating oil supplying apparatus for oil-air or oil-mist lubrication (not shown in FIG. 12) is provided adjacent to the bearing 80.

Similarly to the embodiment shown in FIG. 2, the retainer 84 is also positioned with respect to the inner periphery of the outer ring 81, and a guide surfaced of the retainer 84 is provided on a retainer outer surface 84a opposed to an inner surface 81a of the outer ring 81. In this embodiment, H is a radial length of a section of an annular portion 84r of the retainer 84, and L is an axial length of the same. Other constitution than the above main different point is the same as that in the above-described embodiment, and the working and the effect can be obtained similarly.

Embodiments applied to the cylindrical roller bearing apparatus will be described below. A result of calculation in various sectional shapes in the embodiments will be shown.

(Calculating condition)

Dimension of retainer outer diameter: 99.5 mm.

Roller diameter: 9 mm

Roller length: 9 mm

Number of rollers: 20

Roller PCD (dm): 91 mm

Retainer material: PEEK resin

Rotation speed: 25000 rpm

Guide clearance: 0.4 mm

Retainer unbalance: 0.5 g·cm

A calculation result of the deformation amount of retainer under the above condition is shown in Table 1.

TABLE 1

| | Retainer width | Pocket width | Retainer inner diameter | dm | [Al] $LH^3/dm^2$ | Amount of deformation |
|---|---|---|---|---|---|---|
| 1 | 17.1 | 9.3 | 90.51 | 91 | 0.043 | 0.13 |
| 2 | 17.1 | 9.3 | 91.5 | 91 | 0.030 | 0.18 |
| 3 | 17.1 | 9.3 | 92.5 | 91 | 0.020 | 0.25 |
| 4 | 13.5 | 9.3 | 90.51 | 91 | 0.023 | 0.21 |
| 5 | 13.5 | 9.3 | 91.5 | 91 | 0.016 | 0.29 |
| 6 | 13.5 | 9.3 | 92.5 | 91 | 0.011 | 0.42 |

From this calculation result, the condition 1 shown in Table 1 can obtain the smallest amount of deformation. Taking the deformation amount of the retainer at the high-speed running time into consideration, [AI≥0.025] $LH^3/dm^2 \geq 0.025\ mm^2$ is required.

Figure 5A:
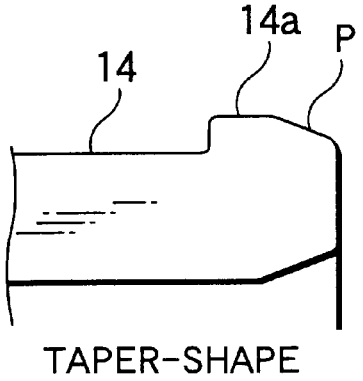
FIGS. 5A to 5C are diagrams showing modified examples of a shape of a retainer.
Figure 5B:
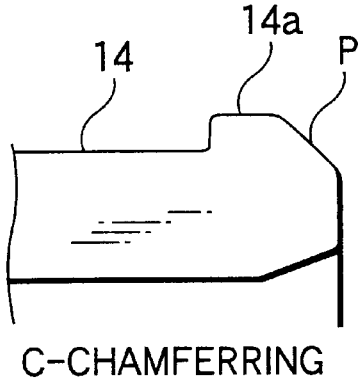
Figure 5C:
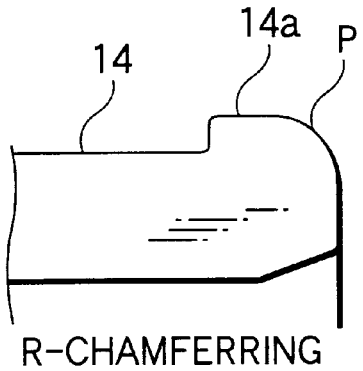

In view of the axial distance between the retainer guided surface and the effective width of the outer ring raceway surface, a position P of the guided surface of the retainer is set so as to be axially away from the intersecting point of the lead-in portion 11b and the outer ring inner surface 11a by a distance of more than 0.5 mm. In this state, the calculation is performed by further changing a relief shape of the retainer outer surface 14a as shown in FIGS. 5A to 5C.

(a) taper-shaped relief: FIG. 5A (b) C-chamfering relief: FIG. 5B (c) R-chamfering relief: FIG. 5C It was found that there was no problem in any shapes.

Test spec. and test condition of a comparison test that the inventors took will be described below.

Bearing spec.: N-type cylindrical roller bearing

Inner diameter: 70 mm

Outer diameter: 110 mm

Roller diameter: 9 mm

Roller length: 9 mm

Roller PCD (dm): 91 mm

Embodiment: Outer Ring Guide Type Retainer

Material: PEEK

Retainer guide clearance: 0.4 mm

Retainer width: 18.5 mm

Retainer thickness: 5.2 mm

Comparative Example

Roller Guide Type Retainer

Material: polyamide 66

Retainer width: 11.8 mm

Retainer thickness: 4.3 mm

Test Condition

Radial inner clearance at the built-in time: 0 μm

Lubrication: oil-air lubrication

Rotation speed: increase until bearing rotation becomes impossible

Figure 6:
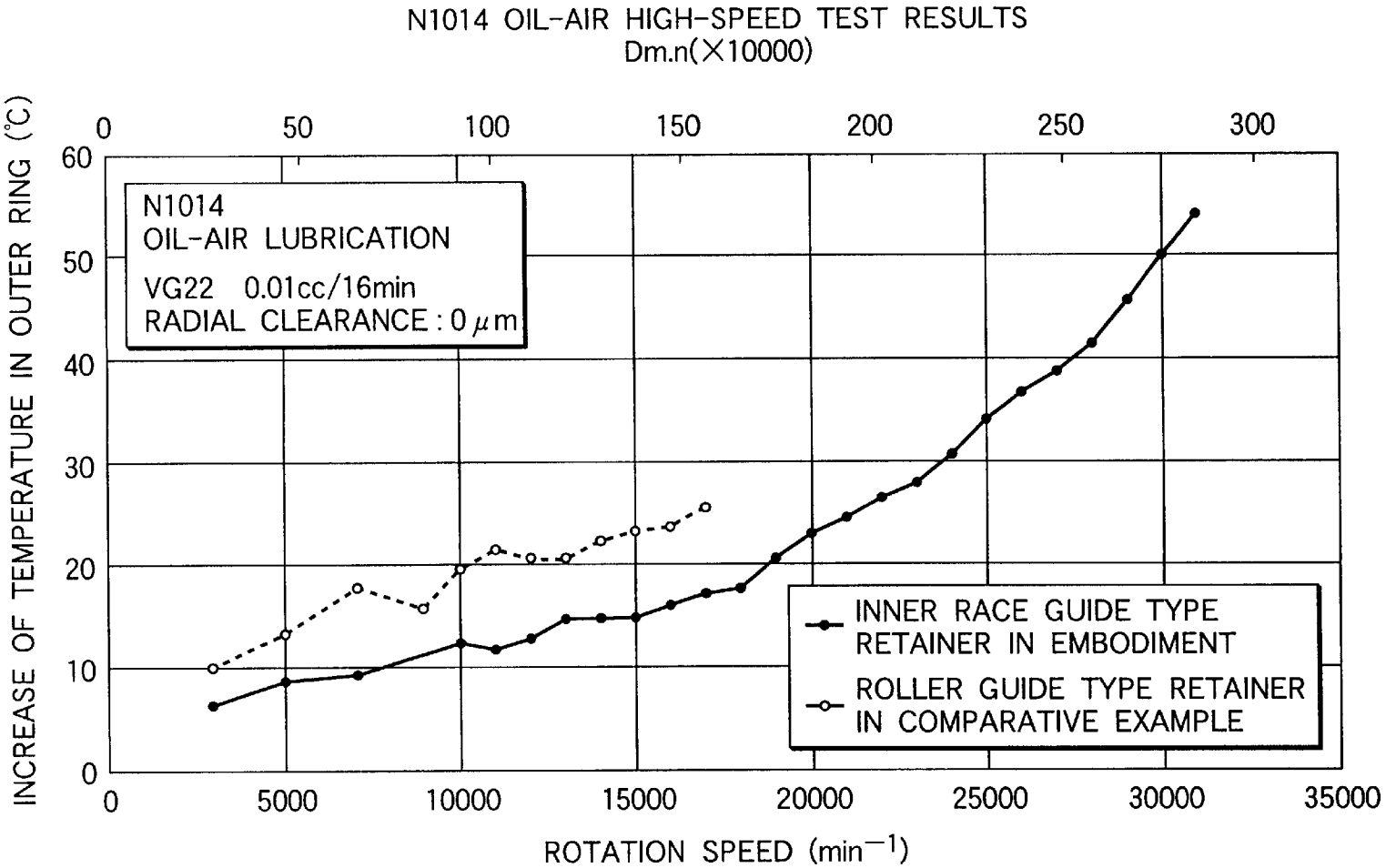
FIG. 6 is a diagram showing a test result in the embodiment and a comparative example in a cylindrical roller bearing apparatus.

A result of the comparison test is shown in FIG. 6. According to this test, the roller guide type retainer of the comparative example, when the rotation speed was raised up to 18000 rpm, broken down. This is because the strength of the retainer itself (sectional shape, material) was weak, the pocket portion interfered with the movement of the roller due to whirling by centrifugal force and the amount of radial deformation, and an excessive load was applied onto the retainer.

On the other hand, in the outer ring guide type retainer of this embodiment, the increase of temperature was also lower than that in the roller guide retainer of the comparative example, the limit rotation speed also extended dramatically, and there was no problem even if the rotation speed was raised up to 31000 rpm, so that it could be confirmed that the shape of the embodiment was effective.

Next, embodiments applied to an angular ball bearing apparatus will be described. A result of calculation in various sectional shapes in the embodiments is shown.

(Calculating Condition)

Bearing inner diameter: 65 mm

Retainer outer diameter: 86 mm

Ball diameter: 7.144 mm

Number of balls: 28

Ball PCD (dm): 82 mm

Retainer material: PEEK resin

Rotation speed: 30000 rpm

Guide clearance: 0.4 mm

Retainer unbalance: 0.5 g·cm

A calculation result of the deformation amount of retainer under the above condition is shown in Table 2.

TABLE 2

| | Retainer width | Pocket width | Retainer inner diameter | dm | [Al] $LH^3/dm^2$ | Amount of deformation |
|---|---|---|---|---|---|---|
| 1 | 16 | 7.65 | 78 | 82 | 0.040 | 0.17 |
| 2 | 16 | 7.65 | 79 | 82 | 0.027 | 0.24 |
| 3 | 16 | 7.65 | 80 | 82 | 0.017 | 0.38 |
| 4 | 14 | 7.65 | 78 | 82 | 0.030 | 0.21 |
| 5 | 14 | 7.65 | 79 | 82 | 0.020 | 0.31 |
| 6 | 14 | 7.65 | 80 | 82 | 0.013 | 0.48 |

From this calculation result, the condition 1 shown in Table 2 can obtain the smallest amount of deformation. Taking the deformation amount of the retainer at the high-speed running time into consideration, [AI≥0.025] $LH^3/dm^2 \geq 0.025\ mm^2$ is required.

Test spec./test condition of a comparison test that the inventors took will be described below.

Bearing spec.: Angular ball bearing

Inner diameter: 65 mm

Outer diameter: 105 mm

Ball diameter: 7.144 mm

Ball PCD (dm): 82 mm

Number of balls: 28

Combination: two-row back-to-back combination (DB combination, constant-position preload)

Test Condition

Axial spring constant at the built-in time: 100 N/μm

Lubrication: oil-air

Amount of supplied oil: 0.03 cc/16 min

Rotation speed: increase till bearing rotation becomes impossible

Embodiment: Outer Ring Guide Type Retainer [(AI=0.040)] ($LH^3/dm^2=0.040\ mm^2$)

Material: PEEK resin

Retainer guide clearance: 0.4 mm

Retainer width: 16 mm

Retainer thickness: 4 mm

Comparative Example 1

Ball Guide Type Retainer (conventional retainer)

Material: polyamide 66

Retainer width: 15 mm

Retainer thickness: 2.5 mm

Comparative Example 2

Outer Ring Guide Type Retainer [(AI=0.013)] ($LH^3/dm^2=0.013\ mm^2$)

Material: PEEK resin

Retainer guide clearance: 0.4 mm

Retainer width: 14 mm

Retainer thickness: 3 mm

Figure 13:
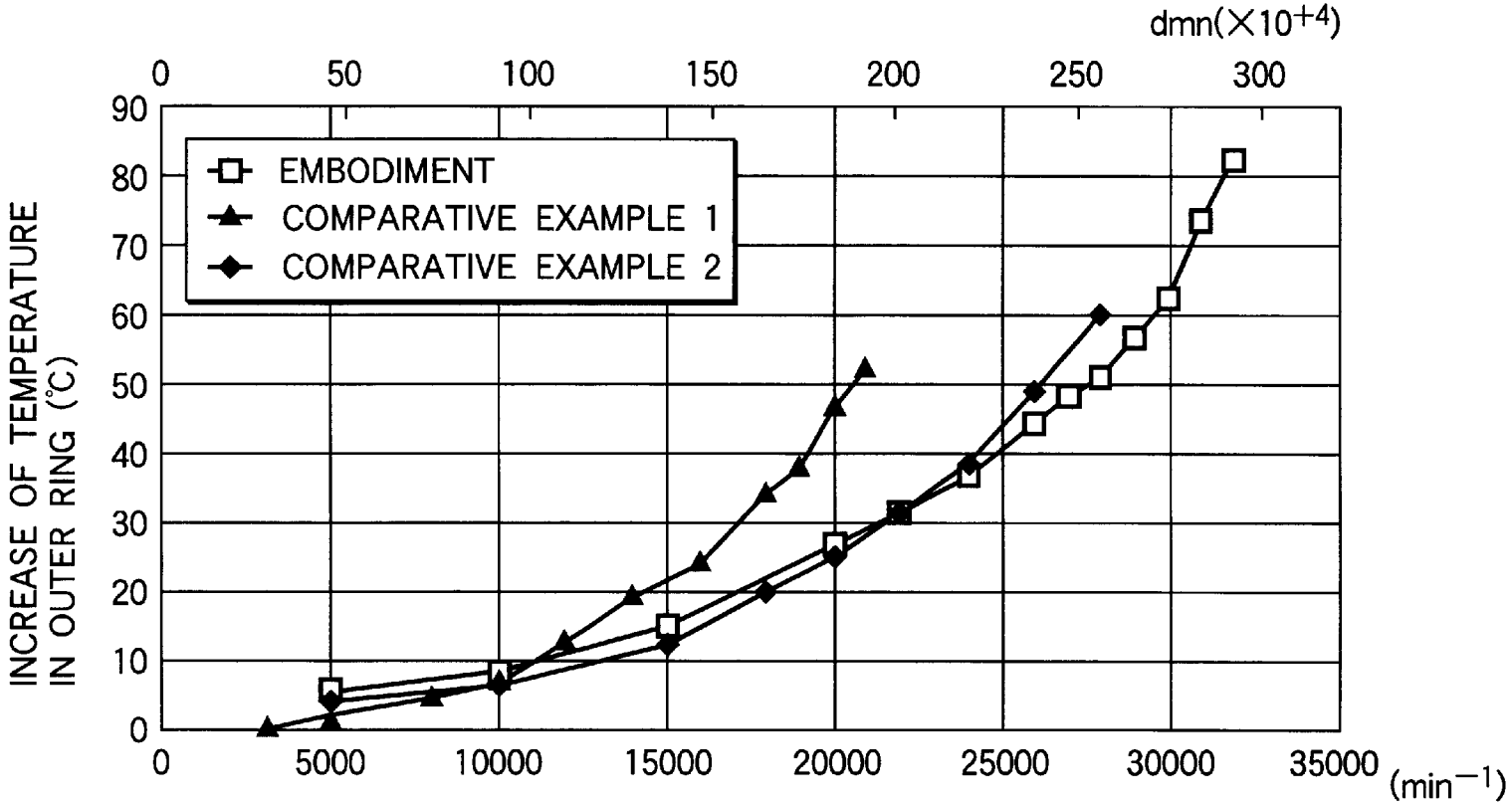
FIG. 13 is a diagram showing a test result in the embodiment and a comparative example in the angular ball bearing apparatus.

A result of the comparison test is shown in FIG. 13. According to this test, the ball guide type retainer of the comparative example 1, when the rotation speed was raised up to 22000 rpm, melted. This is because the strength of the retainer itself (sectional shape, material) was weak, the pocket portion interfered with the running of the ball due to whirling by centrifugal force and the amount of radial deformation, and the retainer was melted and broken by friction heat.

On the other hand, the outer ring guide type retainer in the comparative example 2 was superior to the retainer in the comparative example 1 in temperature increase and high speed. However, when the rotation speed was raised up to 29000 rpm, the retainer guided surface worn, so that the pocket column was broken. Compared with the comparative 1, thought the movement of the retainer was stable in a high-speed region due to the outer ring guide, the sectional strength of the retainer was insufficient and the deformation amount at the running time became large, so that oil film formation on the guided surface became difficult and the guided surface was worn. This is because since unbalance was applied onto the retainer by wear and the deformation amount became large, the excessive stress was produced in the retainer and the column was broken.

On the other hand, in the outer ring guide type retainer of this embodiment, the temperature increase is lower than in the comparative example 1, and the limit rotation speed is larger than in the comparative example 2. In this embodiment, a test machine stopped when the rotation speed was raised up to 33000 rpm. However, in case that the test machine was disassembled, there was nothing abnormal about the retainer, and the raceway surface of the inner ring was only baked. It could be judged that this retainer could further rotate at a higher speed and it could be confirmed that the shape of the invention was effective.

Although the invention has been explained with reference to the embodiments described above, the invention can apply similarly in grease lubrication, the invention should not be limited to the above embodiments, and various modifications and improvements of the invention are possible.

According to the invention, a bearing and a spindle apparatus for machine tool using the bearing are provided, in which lubricity is improved, and deformation and breakdown of a retainer can be suppressed.

Figure 16:
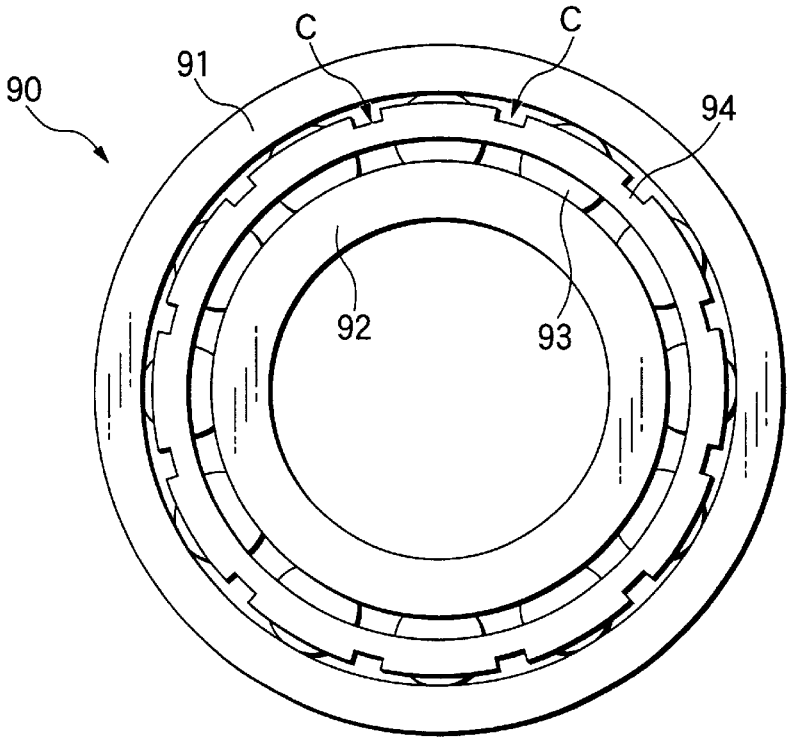
FIG. 16 is a whole side view of a cylindrical roller bearing according to an eighth embodiment of the invention.
Figure 17:
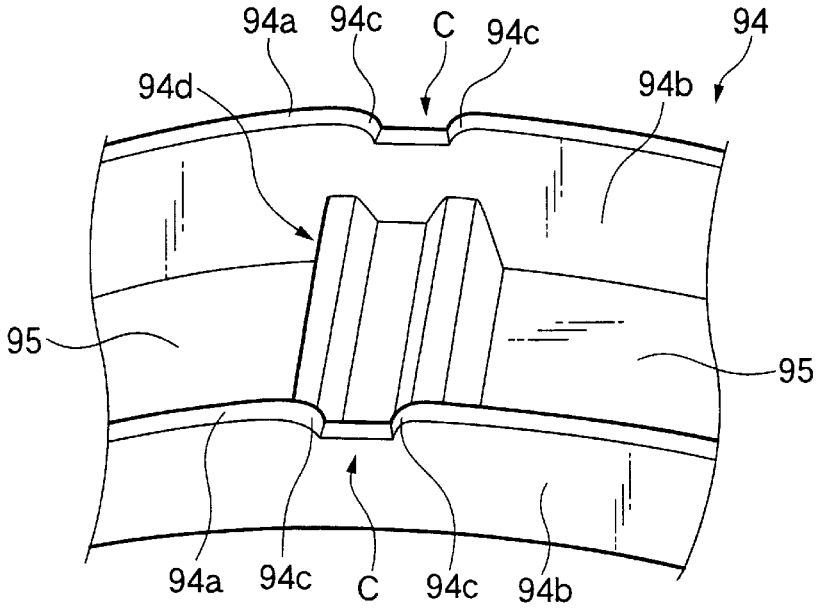
FIG. 17 is a partially enlarged view of a retainer shown in FIG. 16.

Next, FIG. 16 shows a whole side view of a single row cylindrical roller bearing (hereinafter, referred to as "roller bearing") 90 according to an eighth embodiment of the invention. The roller bearing 90 has a retainer 94 of a both side guide and outer ring guide type and made of synthetic resin. FIG. 17 shows a main portion perspective view of the retainer 94 shown in FIG. 16.

The roller bearing 90 shown in FIG. 16 is schematically composed of an outer ring 91 having an outer ring raceway on an inner surface, an inner ring 92 having an inner ring raceway on an outer surface, plural rollers 93 used as a rolling element which are interposed between the outer ring raceway and the inner ring raceway and arranged in the circumferential direction of the roller bearing 90, and the retainer 94 for arranging the rollers 93 at equal intervals in the circumferential direction of the roller bearing 90.

The retainer 94 is formed in a cylindrical shape having the predetermined width, and has pocket portions 95 for retaining the rolling elements at intervals in its circumferential direction as shown in FIG. 17. Sidewalls 94b, 94b extending to the radial outer ring side are respectively formed at the axial both ends of the retainer 94.

The retainer 94 is formed of synthetic resin.

When the inner ring 92 rotates, leading end surfaces (guided surface 94a) of the sidewalls 94b, 94b of the retainer 94 are slide-guided to the inner surface (guide surface) of the outer ring 91 opposed to the leading end surfaces, whereby the retainer 94 rotates relative to the outer ring 91.

In the guided surface 94a opposed to the guide surface of the outer ring 91, plural recesses C are provided at intervals in the circumferential direction. Herein, the recesses C that are rectangular when viewed from a side are respectively formed one by one in the vicinity of a center between the rollers when viewed from a side (in the vicinity of a column portion 94d). This recess C is formed with a sufficient depth in the radial direction of the sidewall 94b of the retainer 94 in order to retain grease.

The depth of the recess C is preferably 0.3 mm or more in view of a function for retaining the grease.

Further, the rounding is applied to a connecting portion 94c between the guided surface 94a of the retainer 94 and the recess C with radius more than 0.2 mm so as to prevent an edge contact.

Here, the number of the recesses C formed on the guided surface 94a of the retainer 94 is set to two or more. This is because the guided surface 94a of the retainer 94 cannot be lubricated sufficiently by only the single recess C.

Figure 18A:
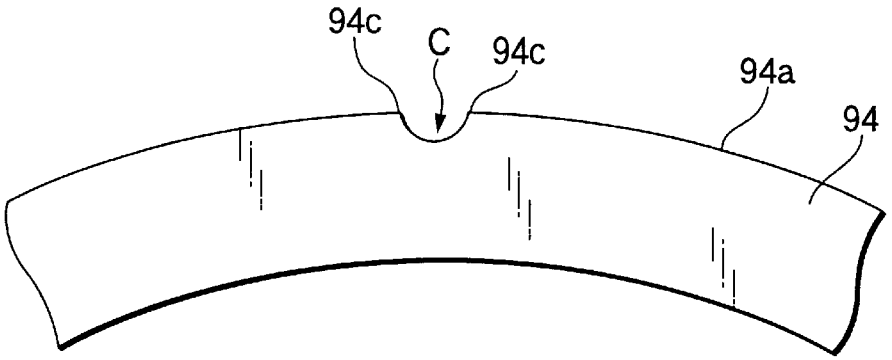
FIGS. 18A to 18C are diagrams showing modified examples of the retainer in FIG. 16.
Figure 18B:
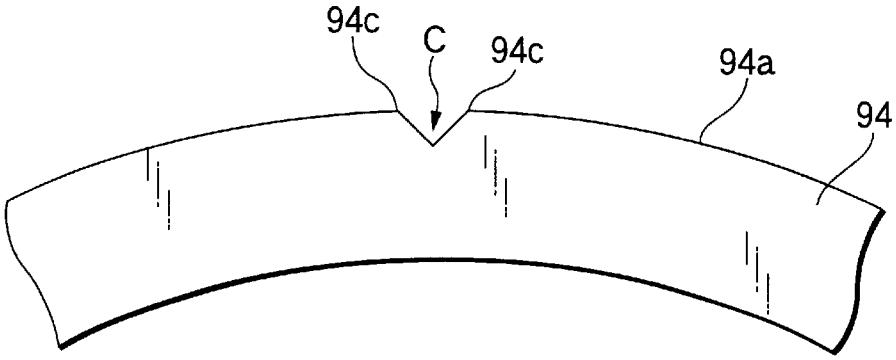
Figure 18C:
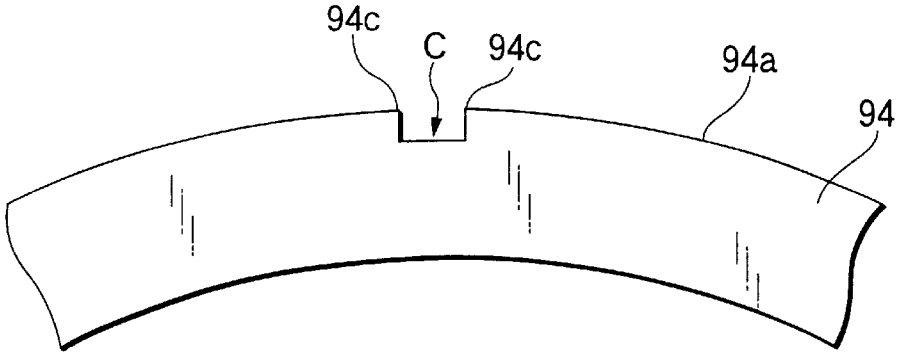

FIGS. 18A to 18C show respectively modified examples of the recess C formed on the guided surface 94a of the retainer 94 according to the invention.

In FIG. 18A, a recess C has a semi-circular shape when viewed from a side. In FIG. 18B, a recess C has a V-shape when viewed from a side. In FIG. 18C, a recess C has a substantially C-shape section when viewed from a side. As described above, as long as the recess C formed on the guided surface 94a of the retainer 94 can retain the grease, it may be formed in any shapes.

Further, also in case that any one of the above recesses is formed, it is preferable that the rounding is applied to a connecting portion 94c between the guided surface 94a of the retainer 94 and the recess C with radius more than 0.2 mm so as to prevent an edge contact.

Figure 19:
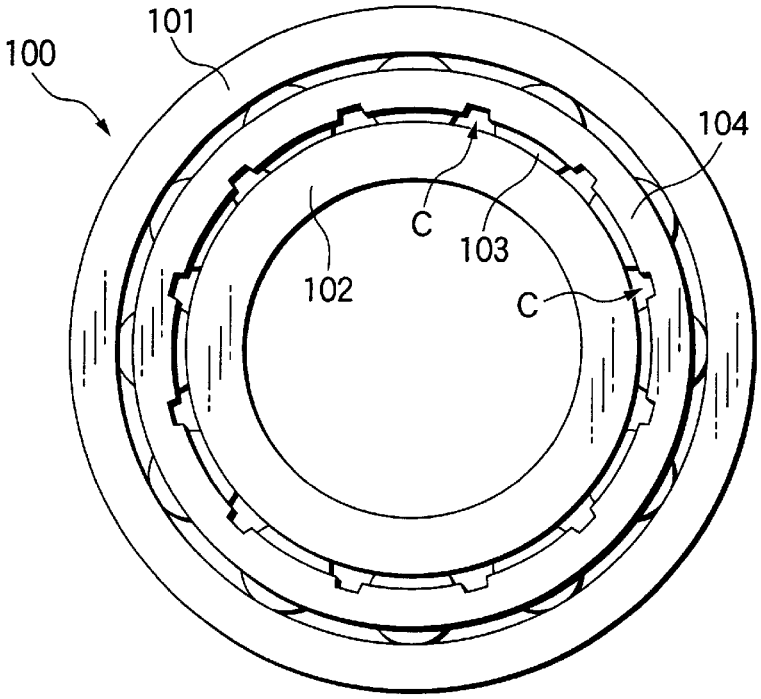
FIG. 19 is a whole side view of a cylindrical roller bearing according to a ninth embodiment of the invention.

Next, FIG. 19 shows a whole side view of a roller bearing 100 having a synthetic resin-made retainer 104 of a both side guide and inner ring guide type according to a ninth embodiment of the invention. The basic constitution is the same as that in the roller bearing 90 in FIG. 16.

Figure 20:
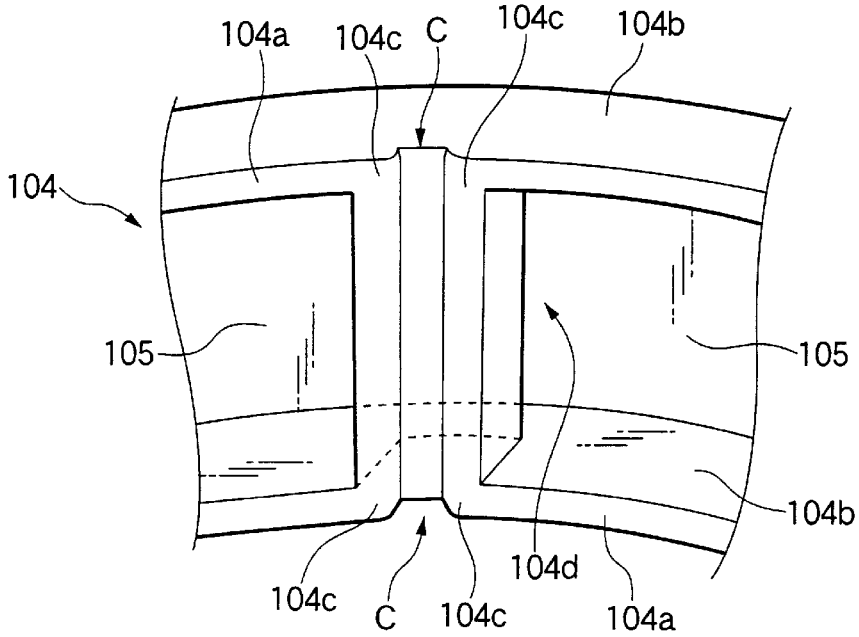
FIG. 20 is a partially enlarged view of a retainer shown in FIG. 19.

As shown in FIG. 20, guided surfaces 104a of sidewalls 104b, 104b of the retainer 104 are opposed to an outer surface of an inner ring 102 and have plural recesses C. The recesses C are formed rectangularly when viewed from a side similarly to the recess in FIG. 16 one by one between pocket portions 105 of the retainer 104.

In this embodiment, the recess C is formed by a groove which is formed in a columnar portion 104d of the retainer and extends axially. The recess C has a depth in a radial direction, and the depth thereof is preferably 0.3 mm or more similarly to that in the eighth embodiment.

Further, it is preferable that the rounding is applied to a connecting portion 104c between the guided surface 104a of the retainer 104 and the recess C with radius more than 0.2 mm so as to prevent an edge contact.

In order to confirm an effect in case that more than two recesses are formed on the guided-surface of the retainer like the rolling bearing of the invention, the following high-speed life test was performed.

A bearing used in this test is a single row cylindrical roller bearing shown in FIG. 16, and is a product equal to designation No. N1014 (outer diameter: 110 mm, inner diameter: 70 mm, roller diameter: 9 mm, roller length 9 mm, number of rollers 20) made by NSK, Ltd.

Further, as the retainer of the bearing, the retainer of a both side guide/outer ring guide type as shown in FIGS. 16 and 17 was used, which has the outer diameter of 99.5 mm and is made of PEEK (polyether etherketone, carbon fiber reinforced grade).

As for lubrication, isoflex NBU 15 made by NOK Kluber K.K. was used for grease lubrication.

Further, the rounding is applied, in order to prevent an edge contact, to a connecting portion between the guided surface of the retainer and the recess with radius more than 0.2 mm as described before.

The target endurance time was set to 1000 hours, and wear condition of the guide surface of the outer ring and grease condition were examined at the rotation speed 16500 $Min^{-1}$ (Dmn value 1500000).

Table 1 shows the endurance time, and the condition of the guide surface of the outer ring and grease in cases that the number of recess formed on the guided surface of the retainer is 0, 1, 2, 3, 10, and 20.

TABLE 3

| Sample | Number of recesses | Endurance time (hrs) | Condition |
|---|---|---|---|
| 1 | 0 | 200 | An Outer Ring guide surface wears. Color of grease changes to black. |
| 2 | 1 | 600 | An Outer Ring guide surface wears. Color of grease changes to black. |
| 3 | 2 | 1000 achievement | Not abnormal |
| 4 | 3 | 1000 achievement | Not abnormal |
| 5 | 10 | 1000 achievement | Not abnormal |
| 6 | 20 | 1000 achievement | Not abnormal |

Regarding the sample 1, in about 200 hours from the start, a testing machine stopped due to the abnormal increase of temperature. At this time, it could be confirmed that wear having a width corresponding to the width of the retainer and a depth of 10 μm was generated on the guide surface of the outer ring. Further, the color of grease changed to black, and iron content (wt %) of grease was 5%, which exceeded largely 0.1% that is an aim value of deterioration.

Also regarding the sample 2, in about 600 hours from the start, a testing machine stopped due to the abnormal increase of temperature similarly to the sample 1.

The samples 3, 4, 5 and 6 could achieve the target endurance time, 1000 hours without problems. There were no wear on the guide surface of the outer ring and no deterioration of the grease, and their guide surfaces and the grease were in a good state and in a state where the continuous use is possible.

From this test result, it was confirmed that by setting more than two recesses formed on the guide surface of the retainer, it was possible to suppress the wear of the guided surface of the outer ring and the deterioration of the grease, and that a long endurance use period of the bearing could be secured.

Further, the invention is not limited to the afore-said embodiments, but appropriate modification and improvement are possible.

Although the recesses is provided one by one between the pocket portions in the above embodiments, they may be provided in every other pocket portions, or the plural recesses may be provided between the pocket portions.

Further, although the recess is formed so as to correspond to the columnar portion of the retainer, the invention is not limited to this. For example, it may be formed at a position corresponding to the rolling element (roller) of the retainer.

As described above, according to the invention, since the recesses are formed at more than two points on the guided surface of the retainer, even if the bearing is used in the high-speed rotational region, it is possible to suppress the wear of the guide surfaces of the outer ring and inner ring, and the deterioration of the grease, so that it is possible to provide a rolling bearing that is superior in lubricity and high-speed stability (low torque, low noise, low vibration, seizure-resistance).

Figure 21:
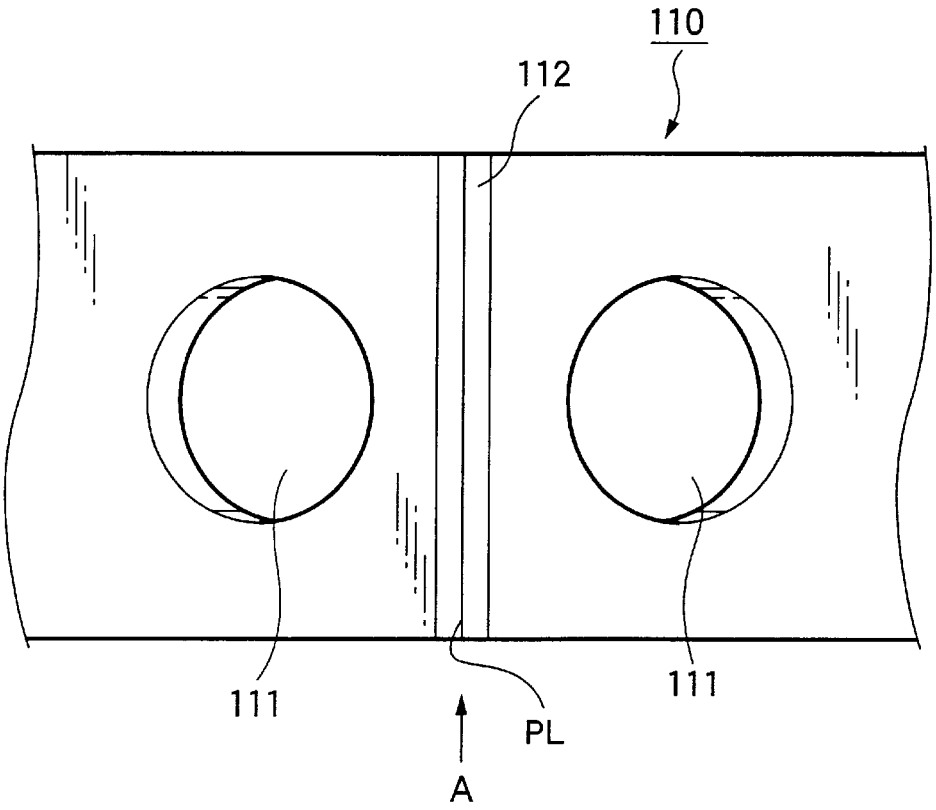
FIG. 21 is a diagram showing a part of a side view of a retainer 110 of a rolling bearing according to a tenth embodiment of the invention.
Figure 22:
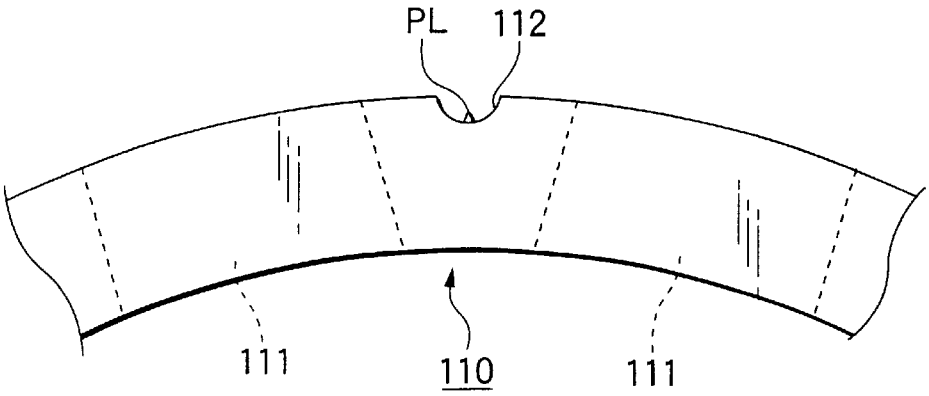
FIG. 22 is a diagram showing a part of a plan view of the retainer 110 shown in FIG. 21.

FIG. 21 is a side view showing a part of a retainer 110 incorporated into a rolling bearing according to a tenth embodiment of invention. FIG. 22 is a plan view showing a part of the retainer 110 viewed from a direction of an arrow A in FIG. 21.

As shown in FIG. 21, the retainer 110 is made of resin, formed in the cylindrical shape having the predetermined width, and has pocket portions 11 for retaining rolling elements with a clearance in the circumferential direction of the retainer. Further, on an outer surface of the retainer 110, a recess 112 extending in the axial direction of the retainer is formed between the pocket portions 111 adjacent to each other, and a parting line PL is formed in the recess 112.

As shown in FIG. 22, a section of the recess 112 is formed in a substantially semi-circle shape that is curved from the retainer outer surface toward the inward of the retainer. The parting line PL is formed in a substantially center of the recess 112.

Figure 23:
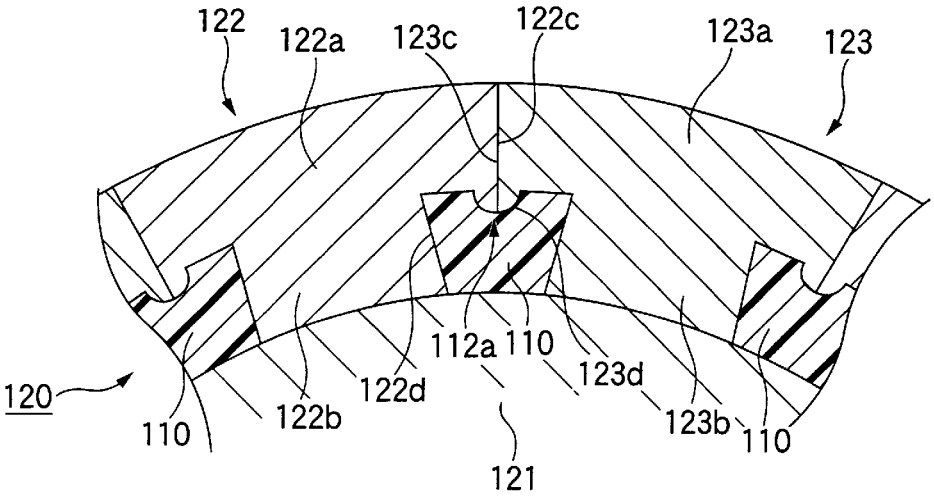
FIG. 23 is a partially sectional view showing a part of a forming mold 120 for molding the retainer 110 shown in FIG. 21.

FIG. 23 shows a part of a forming mold 120 used when the retainer 110 shown in FIG. 21 is formed. A part of the forming mold 120 is composed schematically of a movable mold 121, a first slide core 122, and a second slide core 123.

The movable mold 121 is formed in a cylindrical shape, the outer surface thereof forms an inner surface of the retainer. Regarding the first slide core 122 and the second slid core 123 that are a part of plural slide cores arranged at the periphery of the movable mold 121, the respective sections of the cores are formed in a substantially convex shape, are located side by side along with the outer surface of the movable 121. The cores 122 and 123 are composed of circular arc-shaped base portions 122a, 123a that form the outer surface of the retainer, and columnar protrusions 122b, 123b that are erectly provided substantially perpendicularly to the surfaces on the movable mold 121 side of the base portions and form the pocket portions of the retainer. Projecting members 122d, 123d are formed at end portions of the inner surfaces on the movable mold 121 side of the base portions 122a, 123a of the slide cores 122, 123.

When the forming mold 120 is tightened, and side surfaces 122c, 123c of the base portions 122a, 123a of the slide cores adjacent to each other comes into contact with each other, the projecting members 122d, 123d comes into contact with each other and united to thereby form a protrusion 112a.

Then, resin material is injected into a cavity space, to thereby mold the annular retainer 110 made of the synthetic resin and having the pocket portions spaced in the circumferential direction.

According to this constitution of this embodiment, the parting line PL formed on the outer surface of the retainer 110 does not protrude from the outer surface of the retainer 110 as shown in FIG. 22. Therefore, it is unnecessary to perform after-treatment such as burr removal after injection-molding of the retainer 110. Accordingly, the assembling process of the rolling bearing can be simplified, and yield of parts of the retainer 110 can be also improved. Further, when the retainer 110 is incorporated into the bearing, the parting line PL formed on the outer surface of the retainer 110 does not come into slide-contact with the inner surface of the outer ring of the rolling bearing. Namely, during running of the rolling bearing, the bad operation due to the wear and the torque change is not caused. In this embodiment, the projecting members are provided for all the plural slide cores arranged in the outer periphery of the movable mold 121.

Figure 24:
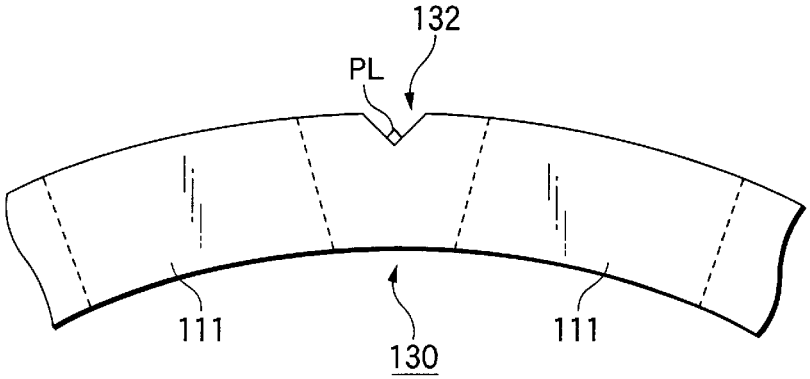
FIG. 24 is a diagram showing a part of a plan view of a retainer 130 of a rolling bearing according to an eleventh embodiment of the invention.

FIG. 24 shows a part of a plan view of a retainer 131 of a rolling bearing in an eleventh embodiment of the invention.

In the retainer 130 shown in FIG. 24, a recess 132 on the outer surface of the retainer 130 is formed in a substantially triangle shape in section. Namely, the recess 132 is formed in the shape of a triangle that becomes convex from the outer periphery of the retainer toward the inner periphery. Accordingly, the shape of a slide core of a forming mold for the recess 132 becomes simple, so that machining of the forming mold is facilitated. Other constitution and action are the same as those in the above tenth embodiment.

Figure 25:
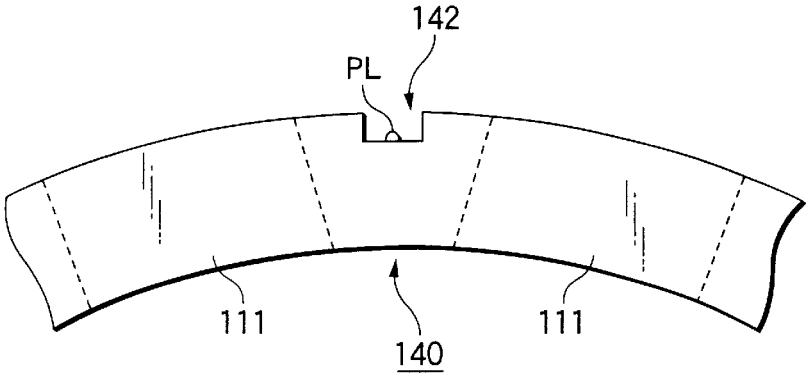
FIG. 25 is a diagram showing a part of a plan view of a retainer 140 of a rolling bearing according to a twelfth embodiment of the invention.

FIG. 25 shows a part of a plan view of a retainer 140 of a rolling bearing according to a twelfth embodiment of the invention.

In the retainer 140 shown in FIG. 25, a recess 142 on the outer surface of the retainer 140 is formed in a substantially rectangular shape in section. Hereby, since a bottom surface of the substantially rectangular recess 142 is formed wide, this recess is effective when a parting line PL is formed wide. Other constitution and action are the same as those in the above-described tenth embodiment.

Figure 26:
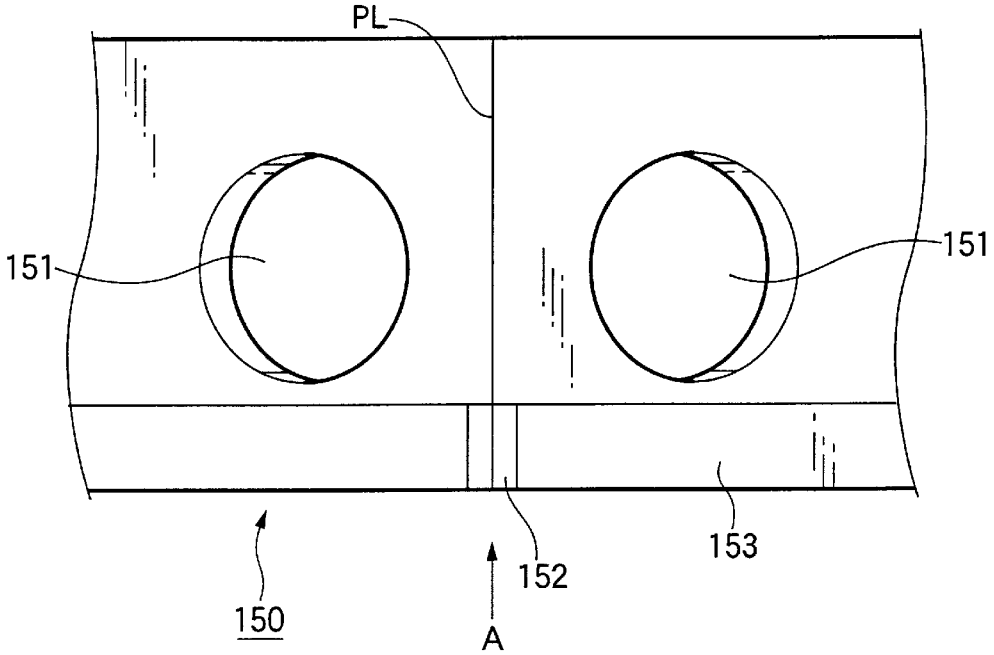
FIG. 26 is a diagram showing a part of a side view of a retainer 150 of a rolling bearing according to a thirteenth embodiment of the invention.
Figure 27:
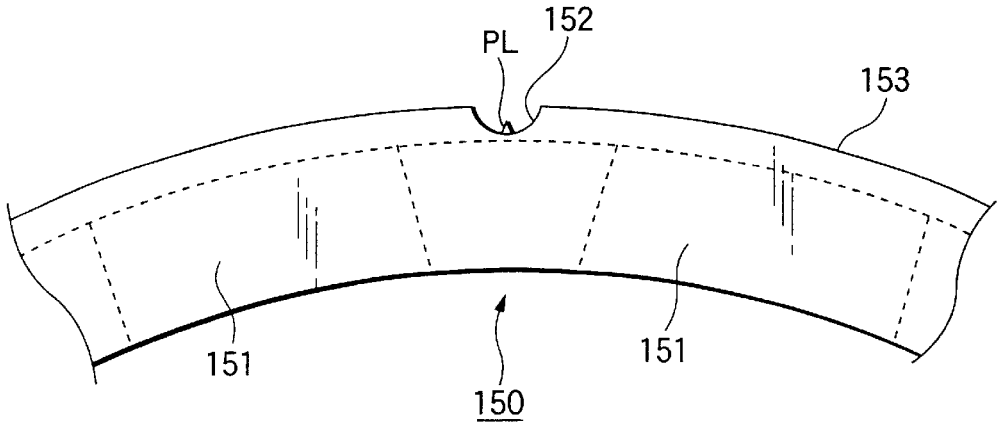
FIG. 27 is a diagram showing a part of a plan view of the retainer 150 shown in FIG. 26.

FIG. 26 shows a side view of a retainer 150 of a rolling bearing according to a thirteenth embodiment of the invention. Further, FIG. 27 shows a plan view of the retainer 150 viewed from a direction of an arrow A in FIG. 26.

The retainer 150 shown in FIG. 26 has a step portion 153 at an outer surface in the vicinity of one axial end portion of the retainer 150, which protrudes outwardly in the radial direction of the retainer 150 with respect to the remaining outer surfaces of the retainer 150. Further, a parting line PL formed in the step portion 153, of a parting line PL formed axially on the outer surface of the retainer 150 is formed within a recess 152 of the substantially semi-circular shape in section.

In such the constitution of this embodiment, since the retainer 150 has the step portion 153 that forms an outermost surface of the retainer 150, the step portion 153 comes into slide-contact with an inner surface of an outer ring during running of the rolling bearing. Namely, by forming the recess portion 152 that stores the parting line PL in the step portion 153 of the retainer 150, the parting line PL formed on the outer surface of the retainer 150 does not protrude from the outermost surface of the retainer 150. Namely, it is not necessary to perform after-treatment such as removal of burr on the outer surface of the retainer 150. Further, even if the retainer is incorporated into the rolling bearing, since the step portion 153 of the retainer 150 comes into slide-contact with the inner surface of the outer ring of the rolling bearing, during running of the rolling bearing, the bad operation due to the wear and the torque change is not caused.

Although the step portion 153 is formed in the vicinity of one axial end portion of the retainer in this embodiment, the step portions may be formed in the vicinity of the both end portions.

Further, the invention is not limited to the afore-said embodiments, but appropriate modification and improvement are possible.

In the invention, though a retainer of a ball bearing is illustrated as a retainer of a rolling bearing, a retainer of a roller bearing may be adopted.

In the invention, the shape of the recess is not particularly limited. As long as it is a shape capable of storing the parting line, it may be pentagonal or hexagonal.

Further, the parting line position in the tenth to thirteenth embodiments may be applied to the recesses in the eighth and ninth embodiments.

As described above, according to the rolling bearing of the invention, since the removing operation of the burr of the parting line is unnecessary, the retainer easily manufactured at a low cost is housed; and since the burr of the parting line does not comes into contact with the inner surface of the outer ring of the rolling bearing, during running of the rolling bearing, the bad operation due to the wear and the torque change is not caused.

Next, a fourteenth embodiment of the invention will be described below.

Figure 39:
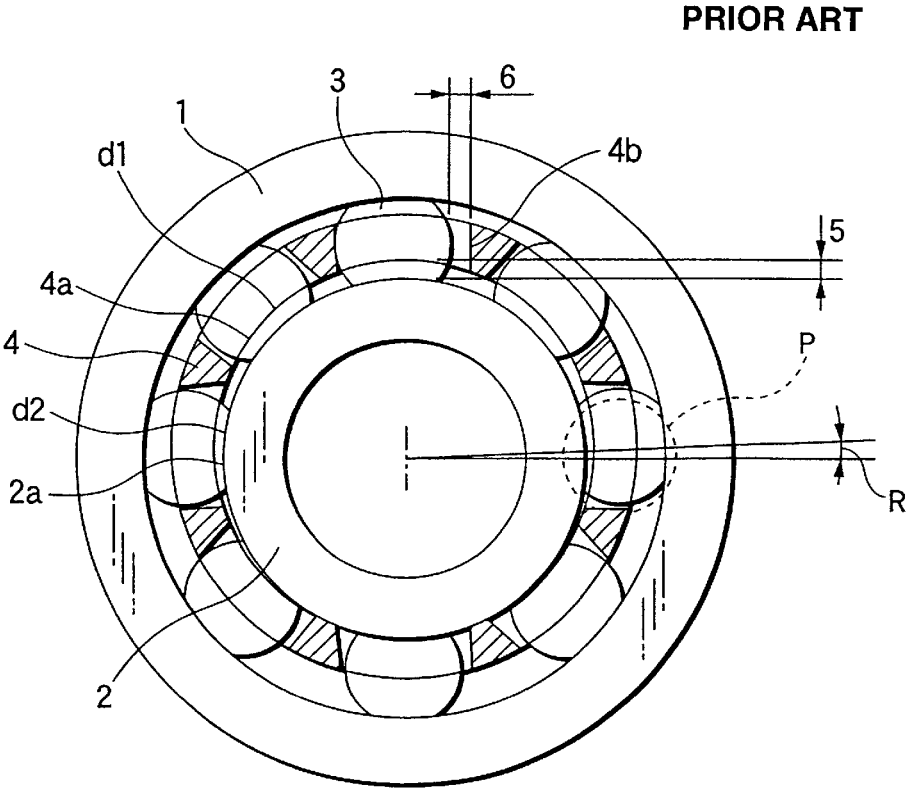
FIG. 39 is a schematic diagram of a general rolling bearing.

A rolling bearing in this embodiment is composed of an outer ring 1, an inner ring 2, and plural rolling elements (balls) 3 incorporated between the outer and inner rings 1, 2, and a retainer 4 for retaining and guiding the plural rolling elements 3. Except that a guide clearance 5 of the retainer and a pocket clearance 6 of the retainer are as follows, the constitution of the outer ring 1, the inner ring 2, the rolling elements 3, and the retainer 4 is the same as the general structure shown in FIG. 39.

Further, in this embodiment, a guide type of the retainer 4 is an inner ring guide.

The guide clearance 5 of the retainer (difference between a diameter d1 of a guided surface (inner diameter surface) 4a of the retainer 4 and a diameter d2 of a retainer guide surface (outer diameter surface) 2a of the inner ring 2) is set to 0.05-0.4% of a guide diameter (diameter) d1 of the retainer 4.

Surface roughness of metal finishing is usually about 1 μm, and if Fc run-out is not set to less than 0.2 μm in this case, stripes are conspicuous on the machined surface, and the external appearance of the machined surface becomes bad. However, it was known that in case that the guide clearance 5 was set to 0.4% or less of the guide diameter d1 of the retainer 4, since the Fc run-out could be kept less than 0.2 μm, the machined surface could be improved (the stripes are not conspicuous on the machined surface).

Further, in case that the guide clearance 5 is made too small, there is a fear that seizure is produced on the guided surface. Therefore, it is necessary to secure the guide clearance 5 having the size of 0.05% or more of the guide diameter d1 of the retainer 4.

The pocket clearance 6 of the retainer (clearance between the retainer pocket 4b and the ball 3) is 0.8-1.8 times the size of the guide clearance 5.

By setting the pocket clearance 6 to 0.8-1.8 times the size of the guide clearance 5, the Fc run-out can be made small. In case that the pocket clearance 6 is much smaller than 0.8 times the size of the guide clearance 5, there is increased a possibility that, upon whirling of the retainer, the ball 3 can hardly exist in an uniform layout position.

On the other hand, in case that the pocket clearance 6 is much larger than 1.8 times the size of the guide clearance 5, there is increased a possibility that the ball 3 exists in a position of a large unequal layout angle.

The structure of the invention is not particularly limited, except that the outer ring 1, the inner ring 2, the rolling element 3, the retainer 4 have the above structure.

This embodiment is simply an embodiment disclosed in order to explain the rolling bearing of the invention, the invention is not limited to this embodiment, various change may be freely combined within a range of the invention. The bearing type can be also selected appropriately from an angular ball bearing, a deep groove ball bearing, a roller bearing and the like within the range of the invention.

Further, in this embodiment, though the retainer 4 is the inner guide type and the ball 3 is used as the rolling element, the retainer may be an outer ring guide type and the rolling element may be a roller.

As long as the guide clearance 5 of the retainer and the pocket clearance 6 of the retainer are set as described above, the whole shape of the retainer and the shape of the pocket may be also designed to any shapes and are not limited.

The guide clearance and the pocket clearance of this embodiment can be applied also to the aforesaid first to thirteenth embodiments.

Figure 28:
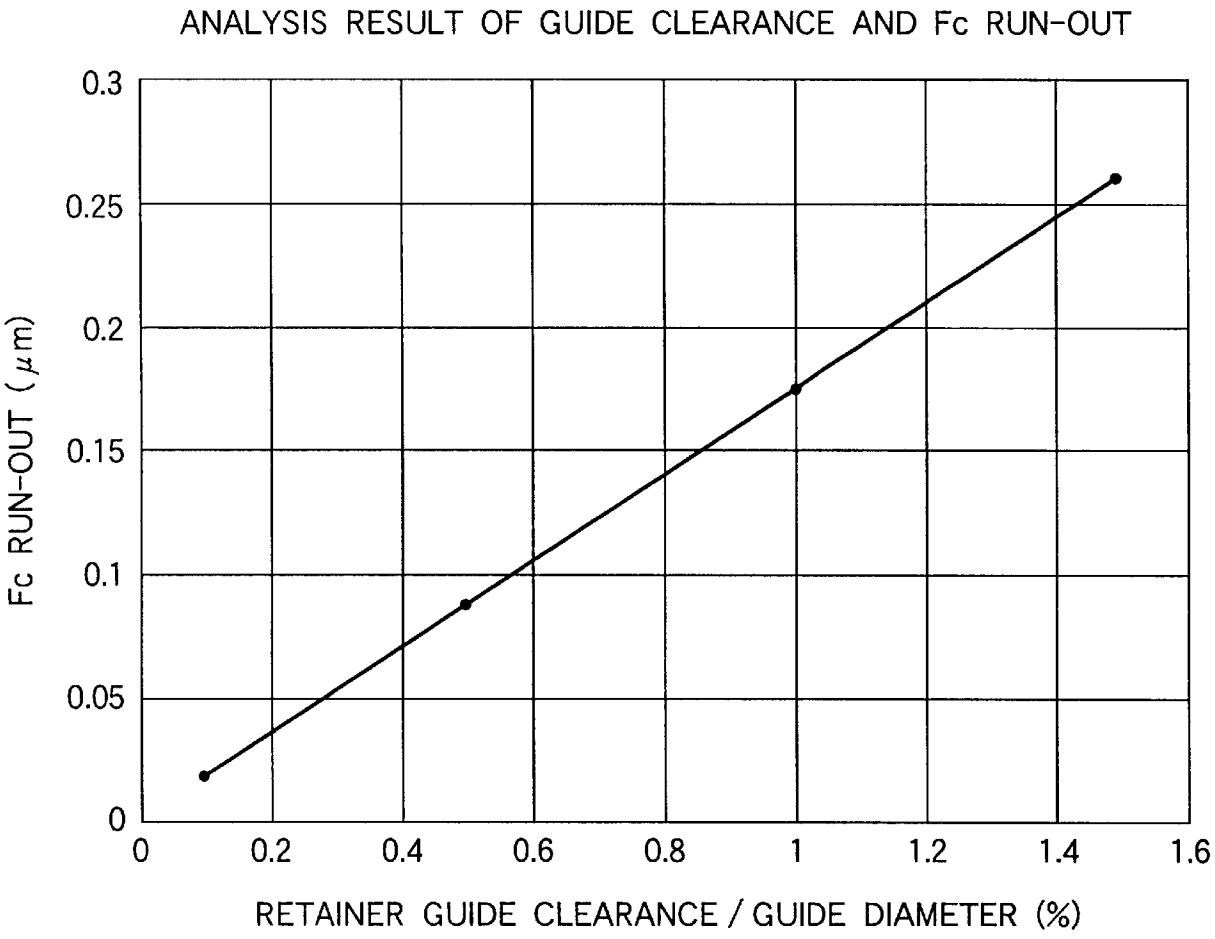
FIG. 28 is a diagram showing an analysis result of a retainer guide clearance and Fc run-out.

Here, FIG. 28 shows an analysis result representing the relation between a guide clearance of a retainer of an angular bearing and Fc run-out.

[Condition]

Inner diameter: 85 mm
PCD: 107 mm
Ball diameter: 12.7 mm
Number of balls: 22
Ball: ceramic ball
Contact angle: 20°
Rotation speed: 14000 rpm
Axial load: 1000 Kgf An analysis method is as follows:

① The relation between the guide clearance of the retainer and the ball unequal layout angle is assumed as follows:

$$\Delta\theta i = \Delta c / dm \cdot \cos \theta i \quad (A)$$

Δc: guide clearance
dm: ball PCD
θi: layout angle (rad) of the i-th ball
Δθi: unequal layout angle (rad) generated in the i-th ball
(When the retainer whirls due to the guide clearance, the center portion of each pocket is geometrically shifted by a value of the expression (A). The expression (A) is assumed based on the thought that a center of the ball is, on an average, in a center of the pocket.)

② In case that the angular unequal layout by the expression (A) is produced in each ball, and the inner ring of the bearing rotates upon reception of the axial load, A) Power applied onto each ball from inner and outer rings
B) Centrifugal force of each ball
C) External force
D) Elastic proximity amount of each ball and inner and outer rings
E) Displacement of bearing center the bearing displacement in which the total of A), B), and C) is 0 and a contradiction is not produced in D) and E) is obtained by a convergent calculation. Twice the displacement of this radial displacement becomes FC run-out.

From the result of FIG. 28, it is known that by making the guide clearance small, the Fc run-out can be reduced.

Figure 29:
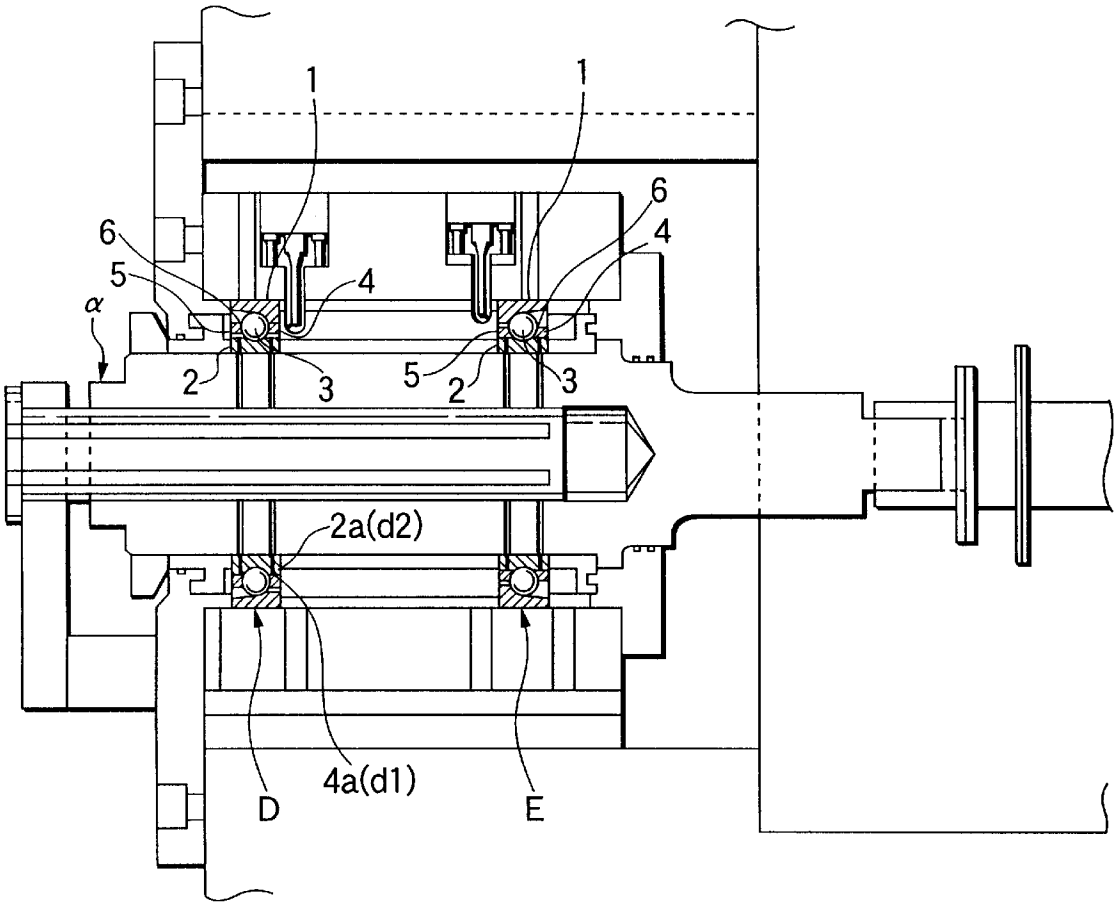
FIG. 29 is a diagram of a test machine into which a rolling bearing of the invention is incorporated.

Next, a test bearing is incorporated into a test machine shown in FIG. 29, and the relation between guide clearance and Fc run-out and the relation between pocket clearance and Fc run-out are respectively tested. Reference characters D and E shown in FIG. 29 are test bearings.

[Condition]

Test bearing: angular bearing (constant-position preload, back-to-back combination, inner ring guide type retainer)

Inner diameter: 85 mm
PCD: 107 mm
Ball diameter: 12.7 mm
Number of balls: 22
Ball: ceramic ball
Contact angle: 20°
Rotation speed: 5000-18000 rpm Effectivity of the rolling bearing of the invention can be confirmed by measuring run-out of a point α shown in FIG. 29 during rotation.

In this test, only the retainer 4 is changed while using the entirely same outer ring 1, the inner ring 2, and the ball 3, and the influence by the guide clearance 5 of the retainer and the pocket clearance 6 was be confirmed.

Figure 30:
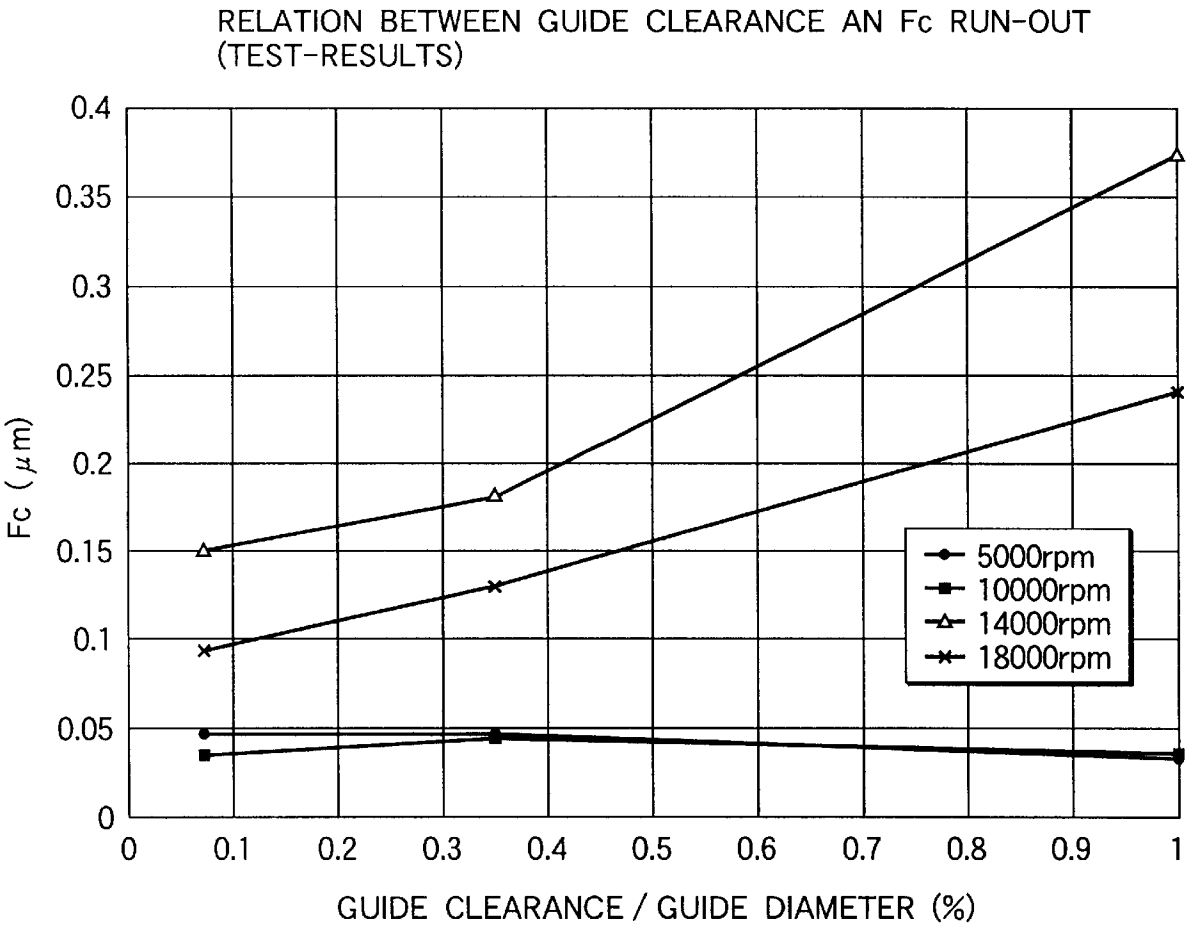
FIG. 30 is a diagram showing the relation between a retainer guide clearance and Fc run-out.
Figure 31:
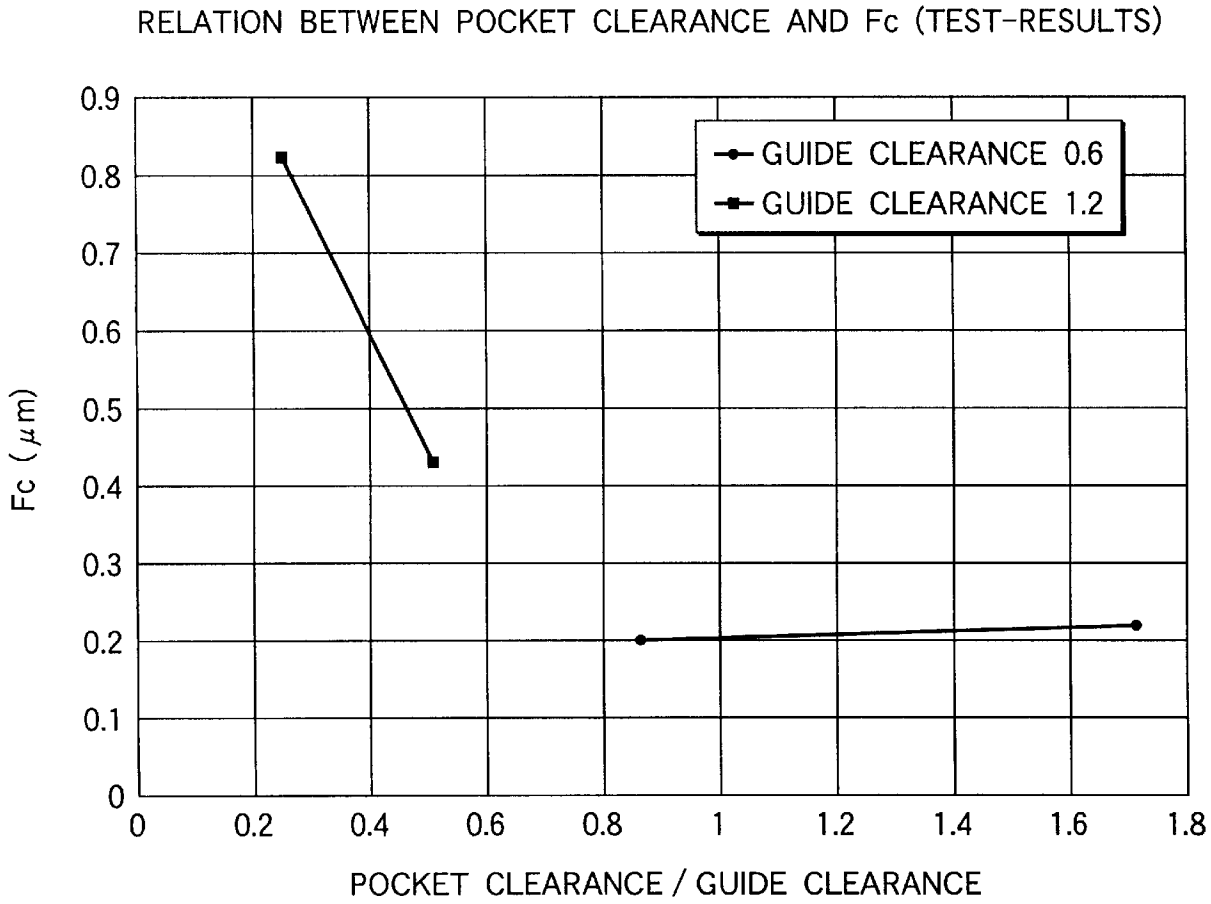
FIG. 31 is a diagram showing the relation between a pocket clearance and Fc run-out.

FIGS. 30 and 31 are test results. FIG. 30 shows the relation between the guide clearance 5 and Fc run-out, and FIG. 31 shows the relation between the pocket clearance 6 and Fc run-out.

By making the guide clearance 5 of the retainer small, the FC run-out can be reduced (refer to FIG. 30). The Fc run-out becomes large in a high-speed rotation of more than 14000 rpm. On the contrary, in a low speed rotation, since there is little influence of whirling of the retainer 4, the Fc run-out is small and there is no correlation between the guide clearance 5 and the Fc run-out.

In case that the size of the pocket clearance 6 is changed, when the pocket clearance 6 is 0.8-1.8 times the size of the guide clearance 5, there is little influence on the Fc run-out (refer to FIG. 31). As the pocket clearance 6 becomes smaller than its size, the Fc run-out becomes larger.

As a retainer material, polyimide resin was used. Hereby, compared with the conventional copper alloy retainer, coefficient of friction on the guided surface can be reduced, and even if the guide clearance 5 is made small, the seizure of the guided surface can be prevented.

Further, the retainer material is not limited to the above material, but it can be appropriately selected and used within the range of the invention. For example, also in case that heat-resistant plastic that is high in rigidity such as PEEK (polyether etherketone) is used, the seizure of the guided surface can be improved.

The test result in FIG. 30 coincides with the analysis result in FIG. 28 in a tendency.

Since the analysis in FIG. 28 is analysis of only the bearing, it is different from the test result including the deformation of the shaft in FIG. 30 in an absolute value of the Fc displacement by about twice. However, their tendencies coincide with each other, so that the effectivity of the rolling bearing of the invention can be confirmed from both viewpoints of the analysis and the experiment.

Figure 32:
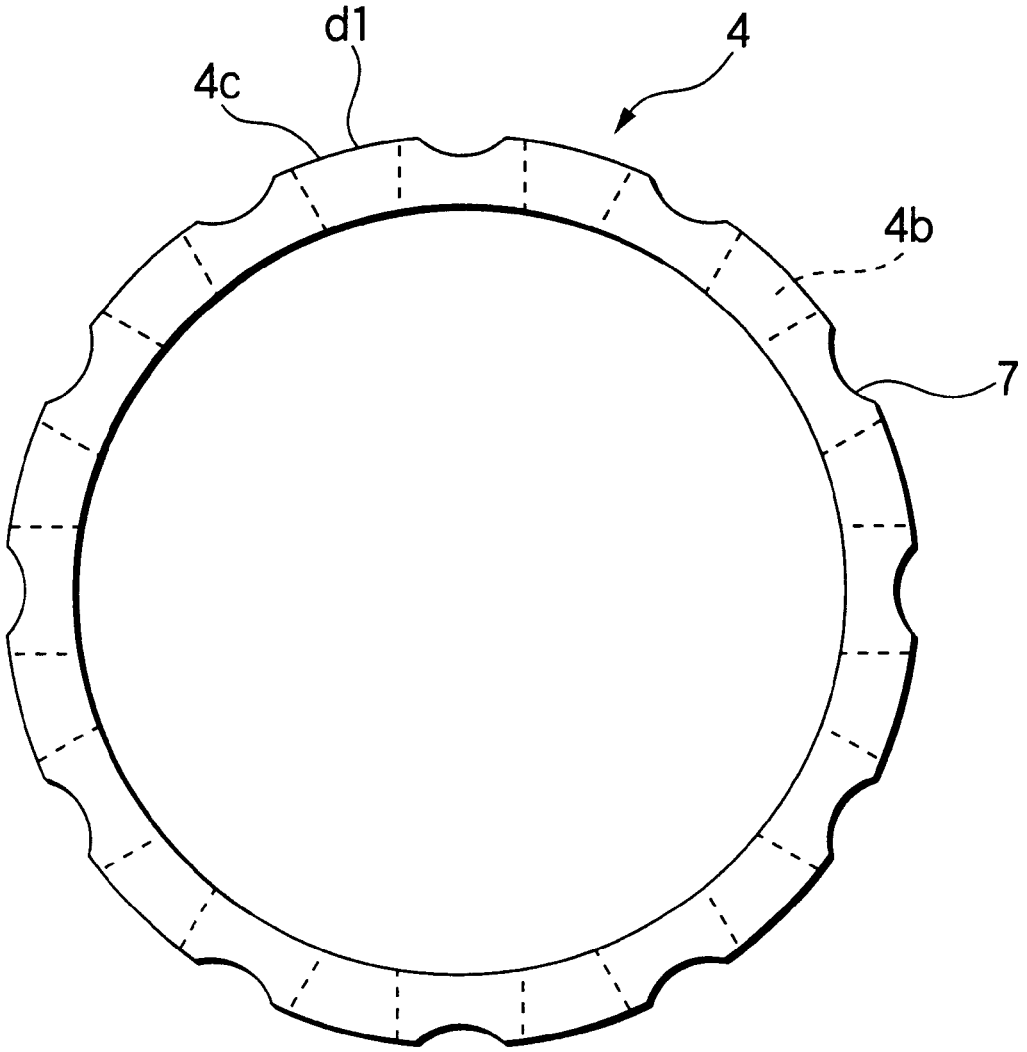
FIG. 32 is a front view showing another embodiment of the retainer.
Figure 33:
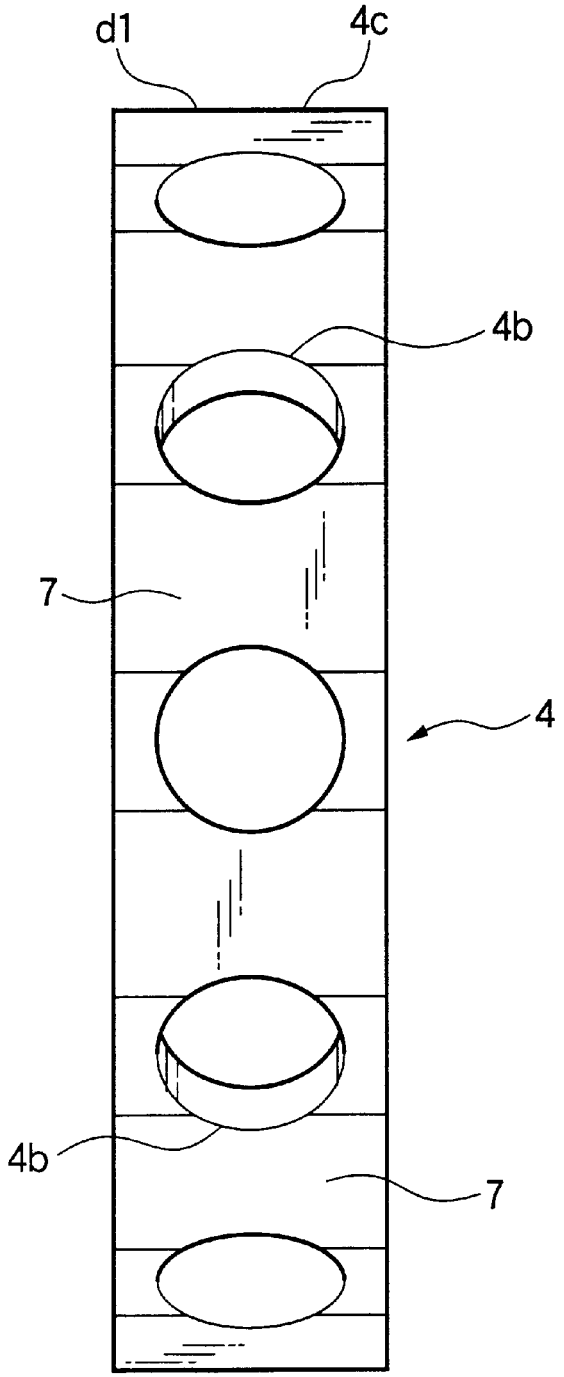
FIG. 33 is a side view of FIG. 32.
Figure 34:
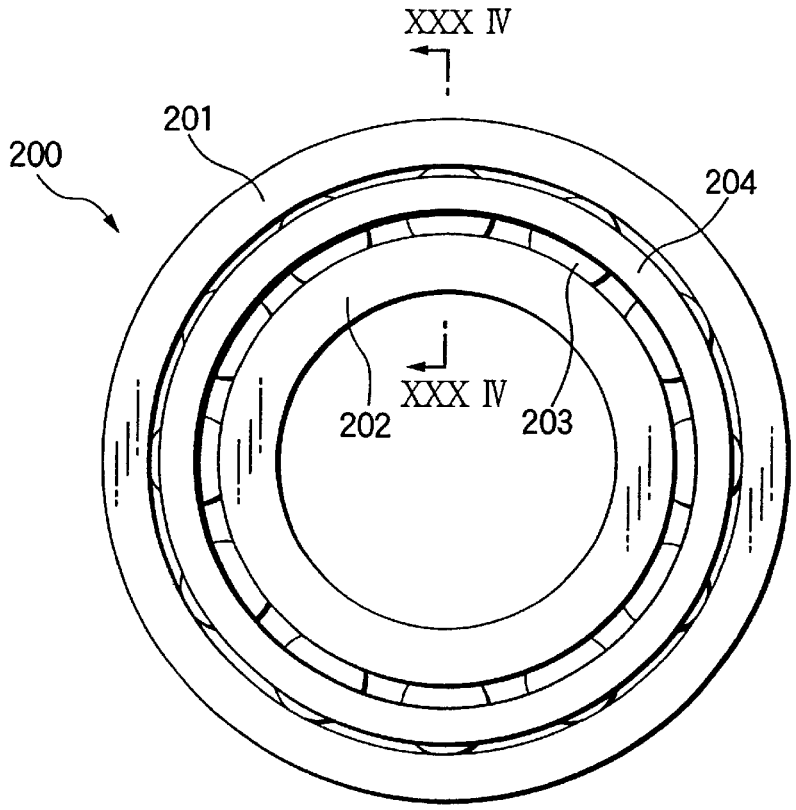
FIG.34 PRIOR ART
FIG. 34 is a whole side view showing a conventional cylindrical roller bearing.
Figure 35:
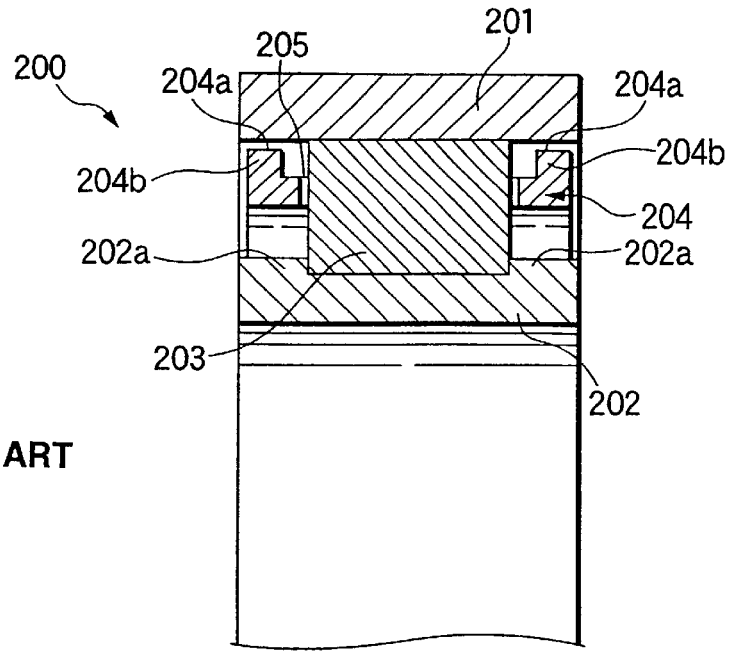
FIG.35 PRIOR ART
FIG. 35 is a sectional view taken along a line XXXIV-XXXIV in FIG. 34.
Figure 36:
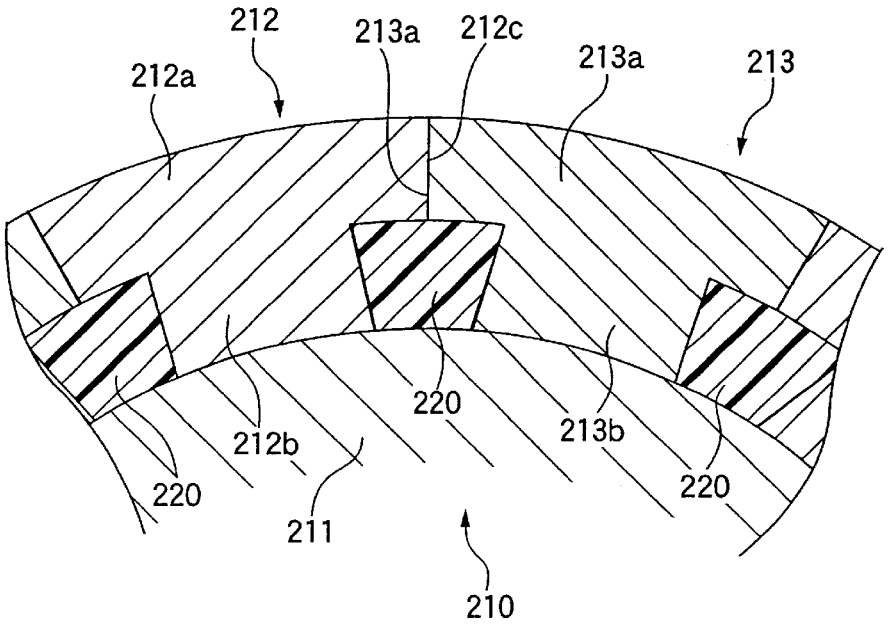
FIG.36 PRIOR ART
FIG. 36 is a sectional view showing a forming mold 210 of a conventional radial draw type.
Figure 37:
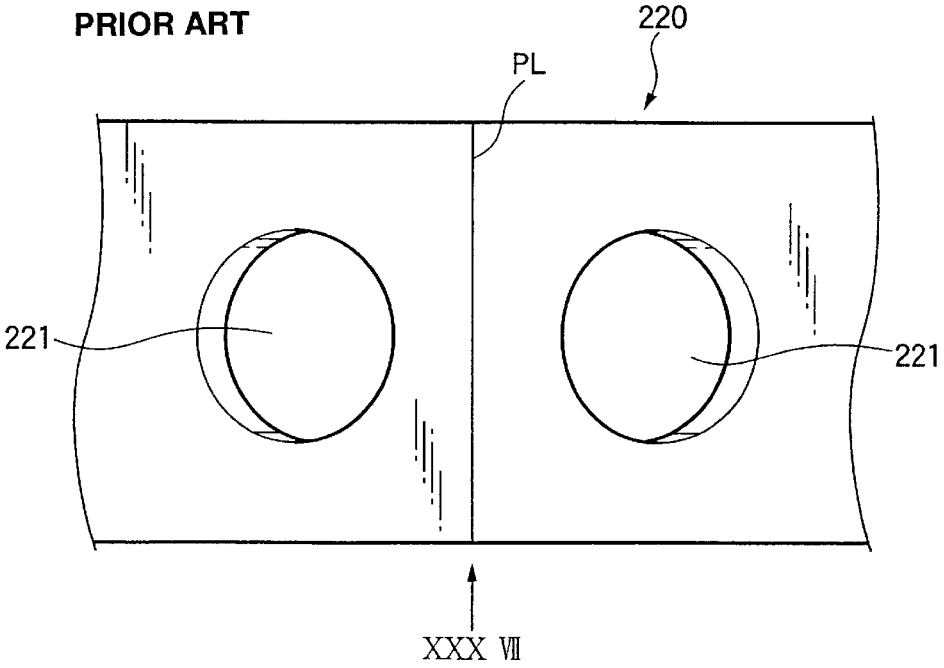
FIG.37 PRIOR ART
FIG. 37 is a diagram showing a part of a side view showing a retainer 220 of a conventional bearing.
Figure 38:
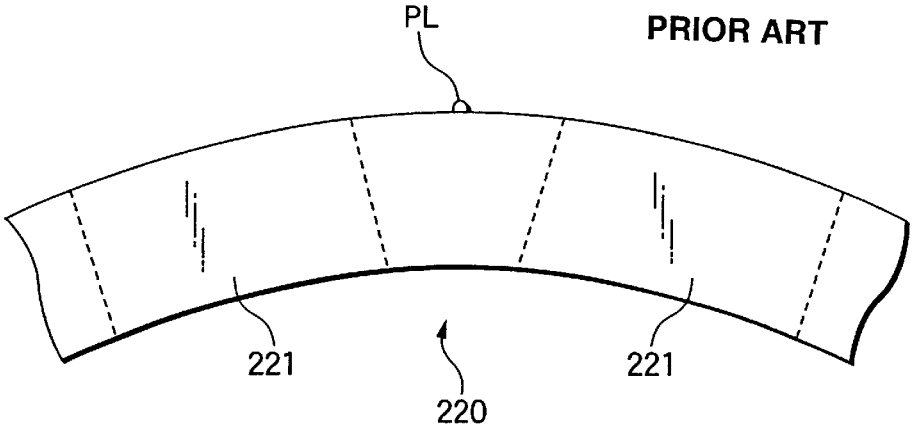
FIG. 38 is a diagram showing a part of a plan view of the retainer 220 shown in FIG. 37.

FIGS. 32 and 33 show another embodiment of the invention.

In this embodiment, in order to prevent seizure in case that a guide clearance 5 of a retainer of an outer ring guide type is made small, oil exhausting grooves 7 as shown in FIGS. 32 and 33 are provided on a guided surface 4c of the retainers 4. Accordingly, heat generation due to oil on the guided surface 4c is reduced and the seizure can be prevented.

According to the invention, as described above, the guide clearance of the retainer is made smaller than that of the conventional retainer, whirling of the retainer is reduced, and the size of the pocket clearance is set to an appropriate value with respect to the guide clearance, whereby the unequal layout of the ball due to the whirling of the retainer is reduced and the rotational accuracy of the bearing can be improved. Namely, according to the invention, Fc run-out at the running time at a high speed can be reduced, and in case that this rolling bearing is used in the spindle apparatus for machine tool, the quality of the machined surface can be improved.

Particularly, a machine tool that performs finishing of a metal mold, requires high-speed machining and surface roughness of several μm. In case that the Fc run-out is about 20% or more with respect to this roughness, there are stripes on the external appearance, which may cause a problem in a finished surface. However, according to the invention, the guide clearance is 0.4% or less the size of the guide diameter, whereby the Fc can be made sufficiently small with respect to a target of the surface roughness and the machined surface can be improved. Further, since the guide clearance is 0.05 or more the size of the guide diameter, there is no fear of the seizure on the guided surface.

In case that the pocket clearance is made much smaller than the guide clearance, when the retainer whirls, there is increased a possibility that the ball cannot exist in the nearly uniform layout position. On the other, in case that the pocket clearance is made much larger than the guide clearance, there is increased a possibility that the ball exists in the position of the large unequal layout angle. In the invention, the pocket clearance is 0.8-1.8 times the size of the guide clearance, whereby the Fc run-out can be reduced.

What is claimed is:

1. A rolling bearing, comprising:

an inner ring having an outer surface;

an outer ring having an inner surface;

a plurality of rolling elements rotatably disposed between the inner ring and the outer ring, *wherein each of the rolling elements is a cylindrical roller*; and, a retainer for retaining the rolling elements, the retainer being made of a resin material, the retainer being positioned with respect to the inner surface of the outer ring or the outer surface of the inner ring, the retainer including a pair of annular portions axially arranged in parallel and a columnar portion coupling the annular portions, wherein the following expression is obtained:

[$AL=LH^3/dm^2 \geq 0.025\ mm^2$] $LH^3/dm^2 \geq 0.025\ mm^2$ in which H is a radial length of a section of [the annular portion] *each of the annular portions*, L is an axial length of [the same] *each of the annular portions*, and dm is [PCD of the rolling element] *a pitch circle diameter of each of the rolling elements*, and further wherein the retainer is formed by an injection-molding and has a recess axially extending on an outer periphery thereof, and the recess has a parting line formed at the time of injection-molding.

2. The rolling bearing according to claim 1, wherein the retainer is positioned with respect to the inner surface of the outer ring.

3. The rolling bearing according to claim 2, wherein the inner ring has ribs at both ends thereof[, and the rolling element is a cylindrical roller].

4. The rolling bearing according to claim 2, wherein the outer ring has ribs at both ends thereof[, and the rolling element is a cylindrical roller].

[5. The rolling bearing according to claim 2, wherein the rolling element is a ball.]

6. The rolling bearing according to claim 1, wherein the retainer is positioned with respect to the outer surface of the inner ring.

[7. The rolling bearing according to claim 6, wherein the rolling element is a ball.]

8. A spindle apparatus for a machine tool [including], *wherein the spindle apparatus includes* the rolling bearing according to claim 1.

9. The spindle apparatus according to claim 8, wherein the retainer further includes a guided surface that is guided by the inner surface of the outer ring or the outer surface of the inner ring, and the guided surface has [two] *ten* or more recesses.

[10. The spindle apparatus according to claim 9, wherein the retainer further includes a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer and the rolling element is set to 0.8-1.8% of the guide clearance.]

11. The rolling bearing according to claim 1, wherein the retainer further includes a guided surface that is guided by the inner surface of the outer ring or the outer surface of the inner ring, and the guided surface has [two] *ten* or more recesses.

[12. The rolling bearing according to claim 11, wherein the retainer further includes a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer and the rolling element is set to 0.8-1.8% of the guide clearance.]

[13. A rolling bearing, comprising:

an inner ring;

an outer ring;

a plurality of rolling elements rotatably disposed between the inner ring and the outer ring; and a retainer for retaining the rolling elements, the retainer being made of a resin material and formed by an injection-molding, the retainer having a recess axially extending on an outer periphery thereof, wherein said recess does not extend around an entire circumference of the retainer, and wherein the recess has a parting line formed at the time of injection-molding.]

[14. The rolling bearing according to claim 13, wherein the retainer further includes a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer and the rolling element is set to 0.8-1.8% of the guide clearance.]

[15. A spindle apparatus for a machine tool including the rolling bearing according to claim 13.]

[16. A rolling bearing, comprising:

an inner ring having an outer surface;

an outer ring having an inner surface;

a plurality of rolling elements rotatably disposed between the inner ring and the outer ring; and a retainer for retaining the rolling elements, the retainer being made of a resin material, the retainer including a guided surface that is guided by the inner surface of the outer ring or the outer surface of the inner ring and a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer and the rolling element is set to 0.8-1.8% of the guide clearance.]

[17. A spindle apparatus for a machine tool including the rolling bearing according to claim 16.]

[18. A rolling bearing comprising:

an inner ring having an outer surface;

an outer ring having an inner surface;

a plurality of rolling elements rotatably disposed between the inner ring and the outer ring; and, a retainer for retaining the rolling elements, the retainer being made of a resin material, the retainer being positioned with respect to the inner surface of the outer ring or the outer surface of the inner ring, the retainer including a pair of annular portions axially arranged in parallel and a columnar portion coupling the annular portions, wherein the following expression is obtained:

$AI=LH^3/dm^2 \geq 0.025\ mm^2$ in which H is a radial length of a section of the annular portion, L is an axial length of the same, and dm is PCD of the rolling element, and wherein the retainer further includes a guided surface that is guided by the inner surface of the outer ring or the outer surface of the inner ring, and a pocket holding the rolling element, wherein a guide clearance between the inner surface of the outer ring or the outer surface of the inner ring and the guided surface of the retainer is set to 0.05-0.4% of a diameter of the guided surface of the retainer; and wherein a clearance between the pocket of the retainer and the rolling element is set to 0.8-1.8% of the guide clearance.]

[19. A rolling bearing comprising:

an inner ring having an outer surface;

an outer ring having an inner surface;

a plurality of rolling elements rotatably disposed between the inner ring and the outer ring; and a retainer for retaining the rolling elements, the retainer being made of a synthetic resin material, the retainer including a guided surface that is guided by the inner surface of the outer ring, wherein the guided surface has two or more recesses and the number of the recesses is the same as the number of rolling elements, wherein a depth of the recesses is 0.3 mm or more, wherein the synthetic resin material comprises glass fiber in the amount of 10-40 wt %, carbon fiber in the amount of 10-30 wt %, or aramid fiber in the amount of 10-30 wt %, wherein the retainer further includes a pocket holding the rolling element, wherein a guide clearance between the inner surface of the outer ring or the outer surface of the inner ring and the guided surface of the retainer is set to 0.05-0.4% of a diameter of the guided surface of the retainer; and wherein a clearance between the pocket of the retainer and the rolling element is set to 0.8-1.8% of the guide clearance.]

[20. Rolling bearing comprising:

an inner ring having an outer surface;

an outer ring having an inner surface;

a plurality of rolling elements rotatably disposed between the inner ring and the outer ring; and a retainer for retaining the rolling elements, the retainer being made of a synthetic resin material, the retainer including a guided surface that is guided by the inner surface of the outer ring, wherein the guided surface has two or more recesses and the number of the recesses is the same as the number of rolling elements, wherein a depth of the recesses is 0.3 mm or more, wherein the synthetic resin material comprises glass fiber in the amount of 10-40 wt %, carbon fiber in the amount of 10-30 wt %, or aramid fiber in the amount of 10-30 wt %, and further wherein the retainer is formed by an injection-molding, and the recess has a parting line formed at the time of injection-molding.]

[21. The rolling bearing according to claim 20, wherein the retainer further includes a pocket holding the rolling element, wherein a guide clearance between the inner surface of the outer ring or the outer surface of the inner ring and the guided surface of the retainer is set to 0.05-0.4% of a diameter of the guided surface of the retainer, and wherein a clearance between the pocket of the retainer and the rolling element is set to 0.8-1.8% of the guide clearance.]

* * * * *